(12) United States Patent
Khosravy

(10) Patent No.: US 8,078,749 B2
(45) Date of Patent: Dec. 13, 2011

(54) SYNCHRONIZATION OF MULTIDIMENSIONAL DATA IN A MULTIMASTER SYNCHRONIZATION ENVIRONMENT WITH PREDICTION

(75) Inventor: Moe Khosravy, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 504 days.

(21) Appl. No.: 12/022,682

(22) Filed: Jan. 30, 2008

(65) Prior Publication Data

US 2009/0193149 A1 Jul. 30, 2009

(51) Int. Cl.
G06F 15/16 (2006.01)
H04N 7/16 (2011.01)
(52) U.S. Cl. .................. 709/231; 709/219; 725/135
(58) Field of Classification Search .................. 709/219, 709/231, 248; 725/86, 135
See application file for complete search history.

(56) References Cited

U.S. PATENT DOCUMENTS

| | | | |
|---|---|---|---|
| 5,767,854 A | 6/1998 | Anwar | |
| 2003/0005140 A1* | 1/2003 | Dekel et al. | 709/231 |
| 2004/0095349 A1* | 5/2004 | Bito et al. | 345/440 |
| 2004/0136404 A1 | 7/2004 | Mahonen | |
| 2006/0170954 A1 | 8/2006 | Leyvi | |
| 2006/0190572 A1 | 8/2006 | Novik | |
| 2006/0215569 A1* | 9/2006 | Khosravy et al. | 370/241 |
| 2006/0230067 A1 | 10/2006 | Tarnoff | |
| 2007/0106683 A1 | 5/2007 | Grabelsky | |
| 2009/0089448 A1* | 4/2009 | Sze et al. | 709/231 |

OTHER PUBLICATIONS

Data Vivalization Through Components, "INTViewer", Multidimensional Data Viewing and Interaction, http://www.int.com/products/ent_vis/INT/INT.htm, last accessed on Nov. 21, 2007, 4 pages.

Nobuo Kawaguchi, et al., "Multi-Dimensional Data Acquisition for Integrated Acoustic Information Research", http://www.inaglab.com/cgi-bin/db.cgi/LREC2002.pdf?page=DBDownload&did=169&rid=32&fid=12&ct=1&fileext=.pdf, 4 pages.

"Data Synchronization Software to Centralize Dimension Management", enterprise dimension manager, http://66.240.156.40/SOFTWARE/CentralizedManagement/tabid/75/Default.aspx, last accessed on Nov. 21, 2007, 2 pages.

* cited by examiner

Primary Examiner — Yemane Mesfin
Assistant Examiner — Carlos Perez

(57) ABSTRACT

Various embodiments are provided for synchronizing with multidimensional data in a knowledge based synchronization framework for a multi-master synchronization environment. Prediction can be employed to transmit the next versions of a sequence of subsets of multidimensional data to consuming clients in an intuitive manner for a given application. For example, applications that render 2-D images on the client of multidimensional objects (e.g., 3-D graphical objects) stored on a server are achieved through synchronizing versions of the 2-D images to the client including predictively pre-computing and/or providing versions of the 2-D images to the client as synchronization updates.

21 Claims, 17 Drawing Sheets

1200

Receive, by server node, a request for version(s) of data derived from multidimensional data via a multimaster synchronization protocol including a knowledge exchange where synchronization knowledge is independent of data type.

1210

Compare the synchronization knowledge from the requesting node and the server node. Compare synchronization metadata from the nodes representing corresponding versions for the data derived from the multidimensional data represented.

1220

Transmit synchronization updates to the node corresponding to the version(s) of the data requested by the node. Update synchronization knowledge of the node.

1230

Optionally, predictively determine next version(s) that are likely to be requested by the node in the future and pre-compute such next version(s), if not already computed, from the multidimensional data.

1240

Optionally, proactively send the next version(s) that are likely to be requested by the node via the synchronization protocol so that the node already has access to the next version(s) at the time of its next request. Try to stay ahead of the requesting node where there are limited choices for the next version.

FIG. 12

SYNCHRONIZATION OF MULTIDIMENSIONAL DATA IN A MULTIMASTER SYNCHRONIZATION ENVIRONMENT WITH PREDICTION

TECHNICAL FIELD

The subject disclosure relates to efficient techniques for synchronizing with multidimensional data in a knowledge based synchronization framework for a multi-master synchronization environment using prediction.

BACKGROUND

Two computing trends continue in parallel. First, the amount of data being stored by computing systems of all kinds continues to grow consistent with advances in storage and processing power, and second, the amount of data shared and concomitant traffic over networks according to a variety of network topologies for connecting different devices is increasing rapidly as well. The two trends together have aided a macro trend of relieving devices that consume data from having to store such data on the consuming device, since they can retrieve the data according to a variety of networking topologies, dynamically, and as needed.

In consideration of these trends further, various large-scale server architectures have developed that enable the consumption of vast amounts of data as needed by the consuming devices from large server farms. For instance, as shown in FIG. 1, data server farms 100 and the like have developed to house massive amounts of data illustrated for conceptual ease as giant storage unit 104. Oftentimes, such data will be multidimensional data, such as 3-D graphical representations of an object, 4-D representations of graphical objects with time as a fourth dimension. The basic idea is that any number of dimensions of data can be stored in storage 104, whether it be graphical data, data cubes, data relating to health care, video, audio, large scale database storage, etc.

Usually, a small subset of the total data is of interest to consuming clients 110 for any given client experience. Moreover, at any given time during any given client experience, it is likely that only a smaller still subset of the small subset of the total data is needed by the consuming client 110. Moreover, due to the limited storage 114 of consuming clients 110, it is not practical to download all of multidimensional data storage 104.

Addressing this delivery need, conventionally, clients 110 have sent a request to data servers 100 as shown by request 120. The server then computes the subset of data 122 from the multidimensional data storage 104 and sends the computed subset of data to the consuming client 110 at 124, whereby the client 110 can render the subset of data at 126, or take any other appropriate action on the requested subset of data. The conventional delivery model can work well for single static image delivered to the consuming client 110 since the one time request does not implicate a lot of inefficiency. For instance, where the client 110 requests a single 2-D image to be constructed from data collected over N different parameters for a period of 10 years at a given geological site stored in storage 104, generally, it makes sense for data servers 100 to compute the needed subset of data and send it to the client 110 as part of the onetime request.

However, where a client 110 has a more complex interaction with the multidimensional data storage 104, such as streaming of images sequenced according to some order specified by the client 110, this conventional model of FIG. 1 can break down because the delay between step 120 and step 126 can become unacceptable to the consuming client 110. This can be either because the amount of data exceeds available transmission bandwidth or because the time to compute the subset of data 122 is unacceptably high. As an example, this might be the case where a video, i.e., a pre-set series of 2-D images, must be delivered to the client 110 according to time sensitive requirements that cannot be met by the existing bandwidth or the networked application handling the requests. While compression can meet some of the needs of transmission where the sequence of images is known in advance, if the client 110 does not have means to decode the compression scheme, the solution works with a limited number of clients 110. Thus, improved ways to efficiently deliver subsets of data from large multidimensional data stores to consuming clients are desired.

The above-described deficiencies of today's server models for processing and delivering multidimensional data on behalf of consuming clients are merely intended to provide an overview of some of the problems of conventional systems, and are not intended to be exhaustive. Other problems with conventional systems and corresponding benefits of the various non-limiting embodiments described herein may become further apparent upon review of the following description.

SUMMARY

A simplified summary is provided herein to help enable a basic or general understanding of various aspects of exemplary, non-limiting embodiments that follow in the more detailed description and the accompanying drawings. This summary is not intended, however, as an extensive or exhaustive overview. Instead, the sole purpose of this summary is to present some concepts related to some exemplary non-limiting embodiments in a simplified form as a prelude to the more detailed description of the various embodiments that follows.

Various embodiments provide synchronization techniques for synchronizing with multidimensional data in a knowledge based synchronization framework for a multi-master synchronization environment. Prediction can be employed to transmit the next versions of a sequence of subsets of multidimensional data to consuming clients in an intuitive manner for a given application, e.g., on a probabilistic basis or based on past requests. In a non-limiting embodiment, applications that render 2-D images on the client of multidimensional objects (e.g., 3-D graphical objects) stored on the server are achieved through synchronizing versions of the 2-D images to the client including predictively providing versions of the 2-D images to the client.

These and other embodiments are described in more detail below.

BRIEF DESCRIPTION OF THE DRAWINGS

Various non-limiting embodiments are further described with reference to the accompanying drawings in which:

FIGS. 12 and 13 are flow diagrams of synchronizing with multidimensional server data as provided in various embodiments, including prediction;

DETAILED DESCRIPTION

Overview

As discussed in the background, among other things, conventional systems for delivering subsets of large amounts of data to consuming clients have been satisfied according to a request/receive model, which is inefficient for most circumstances, considering the time it may take to compute the next subset of data to send to the client and that bandwidth may be limited. Accordingly, more efficient methods are desired.

Accordingly, in consideration of a knowledge based synchronization framework for multi-master synchronization environments, various embodiments described herein model the delivery of N-dimensional data as Y-dimensional data to the client as a synchronization between devices of evolving Y-dimensional data constructed from the N-dimensional data, i.e., synchronization is used to deliver the appropriate versions of Y-dimensional data to the client. In a variety of examples herein, Y is a smaller number than N, such as when 3-D graphical data is transformed to 2-D images (e.g., health care applications) for display at the client, though for the avoidance of doubt, the various embodiments herein are not limited to the case where Y is smaller than N.

In various embodiments, N-dimensional data is transformed to Y-dimensional data for any application or service predicated on the N-dimensional data, and the Y-dimensional data delivered to the client is modeled according to a multi-master synchronization protocol as changes among versions. Where there are a finite number of ways that the Y-dimensional data can evolve on the consuming client, predictive calculation of the next versions that will be requested by the client and/or predictive transmission of the next versions to send to the client can be accomplished through the vehicle of synchronization as well.

As a roadmap for what follows, first, an overview of some of the embodiments described herein is presented. Then, some supplemental context is given for a general mechanism for efficiently representing knowledge in multi-master data synchronization systems. Next, exemplary, non-limiting embodiments and features are discussed in more detail for supplemental context and understanding of alternative embodiments of multi-master data synchronization systems for delivering N-dimensional data to clients as Y-dimensional data, followed by representative network and computing environments in which such embodiments can be implemented.

Figure 1:
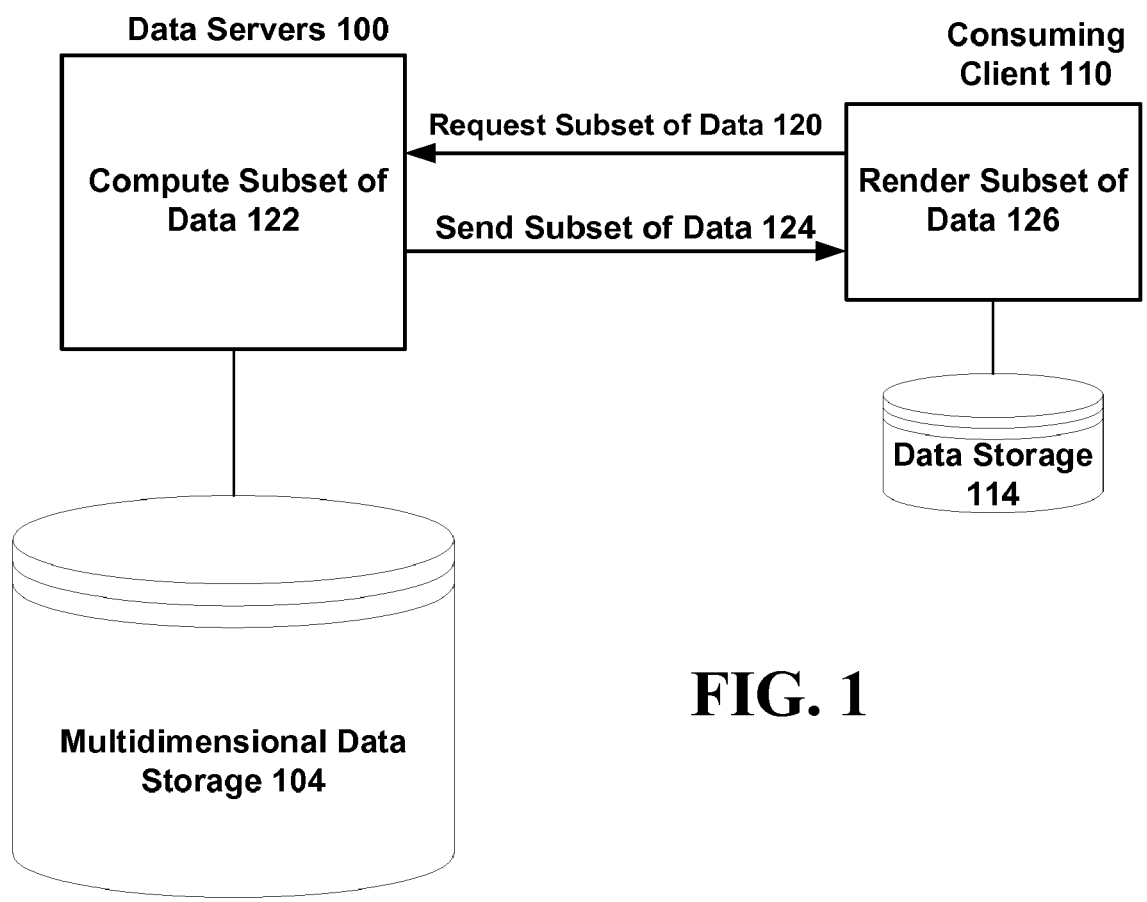
FIG. 1 illustrates a dedicated synchronization system that provides synchronization between two well defined endpoints of the system.
Figure 2:
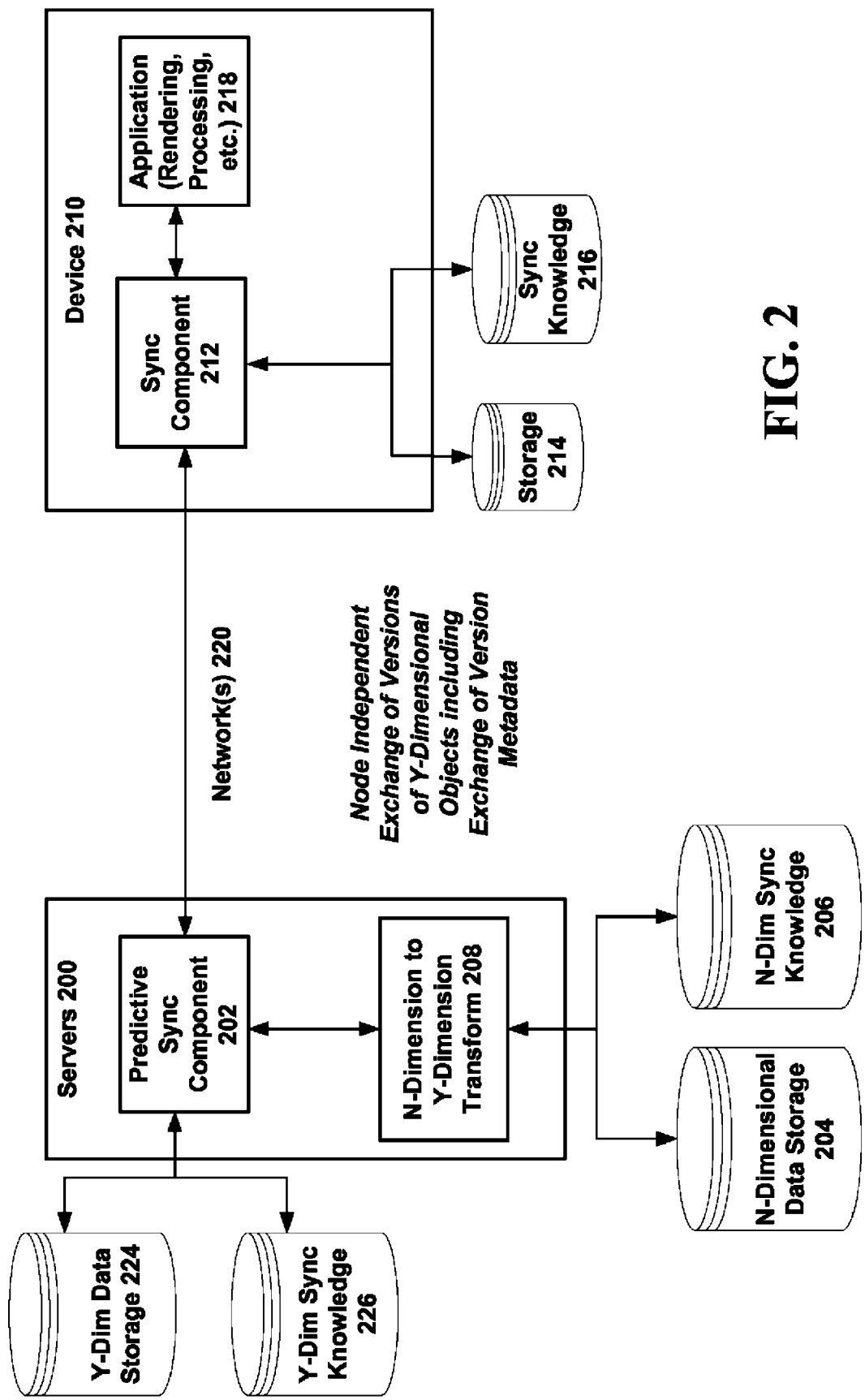
FIG. 2 is a high level block diagram of synchronizing N-dimensional data to a client as Y-dimensional data.

In this regard, various embodiments are directed to a data synchronization framework for nodes of a multi-master synchronization environment to synchronize with multidimensional data by versioning subsets of the multidimensional data, with prediction. For instance, as illustrated in FIG. 2, large-scale storage of a variety of parameters, variables, data, etc. can be achieved via a set of servers 200 and corresponding databases, such as in centralized server and storage architectures, e.g., data centers. In this regard, one function of such servers 200 is to be a repository of relatively massive amounts of data, and in particular, data about a variety of parameters about a given item, such as a patient, a real object, a seismic fault, a region of outer space, business products and services, etc. The possibilities are endless and the amount of data that can be collected about such items is typically very large. Accordingly, such large-scale data is stored in large scale multi-dimensional data store 204 communicatively coupled to servers 200. A knowledge store 206 can be built from the N-dimensional data store 204, which represents synchronization metadata that efficiently describes the versions of items represented by N-dimensional data store 204. Servers 200 include a component 208 that, in response to a request for data, is capable of retrieving and transforming N-dimensional data to Y-dimensional data based on a pre-determined transform to match the request.

For instance, 3-D graphical object data can be transformed to 2-D image data when given an eyepoint to view the 3-D graphical object data. Alternatively, MRIs or CT scan health data can be transformed to 2-D images that are meaningful to health care professionals. Geological data can be converted to images. Statistical data can be transformed to business logic. In this regard, the number of scenarios where N-dimensional data can be transformed to Y-dimensional data, where N is a different integer than Y, are limitless since the kinds of data are limitless.

Once the data is in Y-dimensional form at servers 200, "transmitting" the appropriate data to device 210 can be accomplished using a knowledge based synchronization framework, the details of which are presented in detail below. In this regard, the Y-dimensional data, e.g., image objects, can be stored in storage 224, which can be non-permanent or temporary storage for the life of the experience with device 210, or storage 224 can be persistent and used in connection with future knowledge exchanges without having to start from scratch with respect to each new device. Similarly, synchronization knowledge of the Y-dimensional objects in storage 224 is tracked in knowledge store 226. Then, as described below in more detail, a knowledge exchange ensues in connection with synchronizing device 210 and servers 200.

More specifically, a sync component 202 and a sync component 212 on the server 200 and client 210, respectively, are capable of communicating over network(s) 220 and performing an analysis of what should be sent to device 210 to maximize an efficient synchronization experience by examining the sync knowledge 226 of the Y-dimensional data on servers 200 and the sync knowledge 216 on the client 210.

Where the client 210 has no data in storage 214, i.e., at the start of a new session with servers 200, when requesting the first version of a Y-dimensional object from servers 200, the result is typically the transmission of the full first Y-dimensional object to the client device 210. From that point, however, each subsequent Y-dimensional object requested by the client device 210 can be modeled as a change to the first Y-dimensional object (or other previous Y-dimensional object) in which case versioning of the Y-dimensional objects can be used to efficiently stream updates to a client 210 consistent with requests from an application 218 for additional data. For example, application 218 may make requests for data for a whole variety of reasons, e.g., for rendering, further processing, or for taking any other action with respect to the data.

As requested Y-dimensional objects are requested by application 218 via sync component 212, over time objects and changes accrue in storage 214 on the client 210, as does the synchronization knowledge of the versions of the Y-dimensional data represented in that storage 214. Thus, as the client application 218 makes dynamic requests for additional Y-dimensional objects from servers 200, over time, the versions requested by the client 210 can be analyzed by servers 200 on a predictive basis. For instance, where there are a finite number of directions in which a current Y-dimensional object delivered to client 210 as synchronization updates, servers 200 can begin computing the finite number of Y-dimensional objects that would result, so that when the request from the client 210 is made, those additional Y-dimensional objects are either already pre-computed by transform component 208, or already delivered to client 210. In addition to using an efficient synchronization protocol for determining the knowledge of Y-dimensional objects the device 210 and servers 200 have, this enables a predictive aspect where servers 200 can anticipate, for a given application, what the most likely next versions are that a client 210 will request, and proactively handle.

Figure 3:
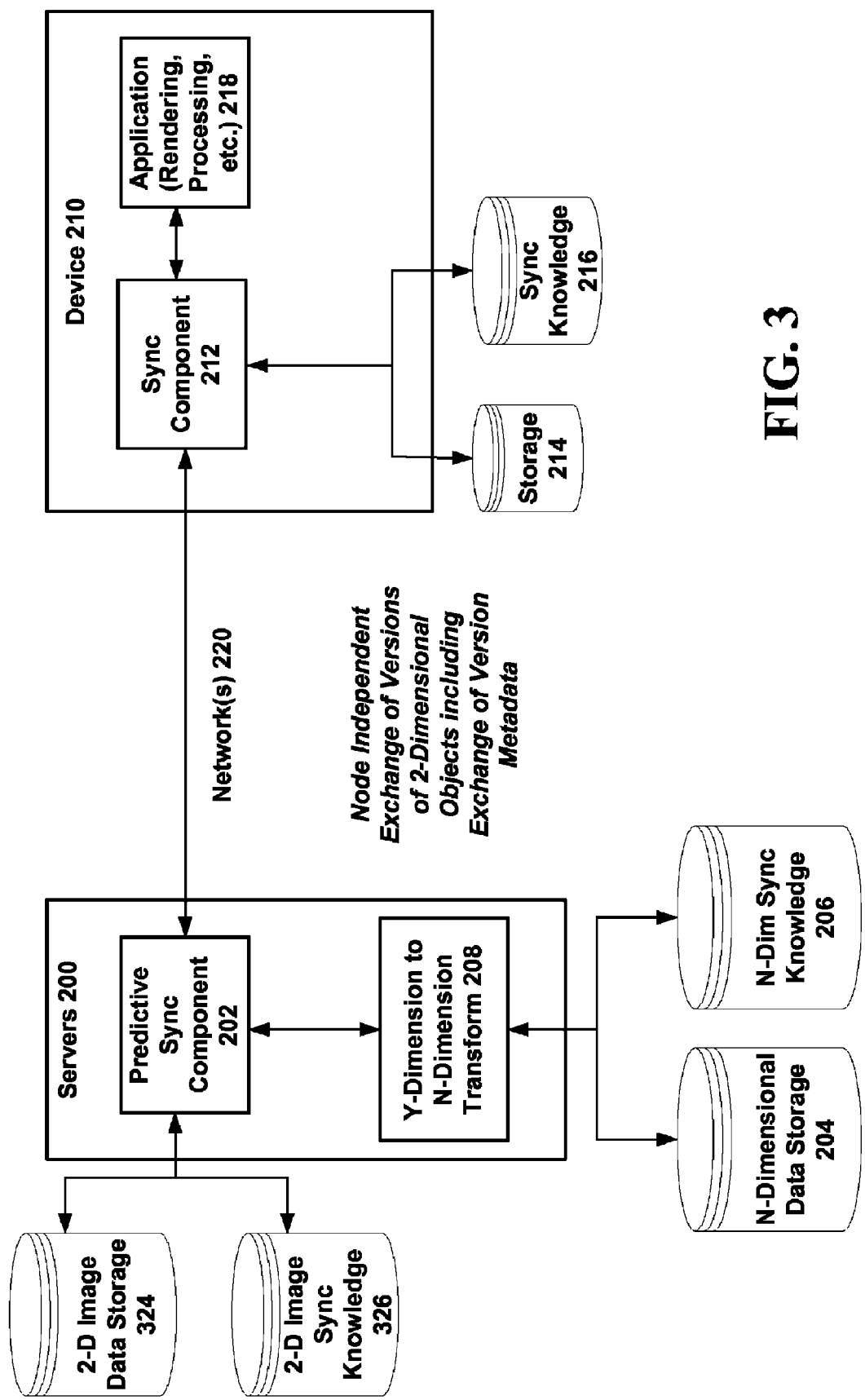
FIG. 3 is a block diagram illustrating an embodiment in the context of multidimensional data displayed as 2-D images on a consuming client.

FIG. 3 illustrates the system of FIG. 2 in the context of 2-D images, a common request made for transforming multi-dimensional data for ease of display on the client 210. Thus, after the first 2-D image is transmitted to client 210, further knowledge exchanges are used to satisfy requests for further 2-D images. Since many operations performed on the 2-D image on the client implicate a small change to the currently displayed 2-D image on the client 210, sending changes to the display as a new version of the 2-D image is an effective way of delivering a stream of related 2-D images to the client. For instance, where the multi-dimensional data 304 represents 3-D data of a human heart, device 210 might initially request a 2-D image of the heart from a certain angle. Since the next image requested by client 210 may be a mere change of angle by 5 degrees to the right, much of the image stays the same and the image can be versioned as changes from the previous image. Over time, say if multiple 5 degree turns are made by client 210, servers 200 can predictively synchronize the next image at 5 degrees using sync component 202 with some confidence that it will be requested next, achieving a maximally efficient synchronization experience for the delivery of Y-dimensional data from N-dimensional data to a client 210.

Figure 4:
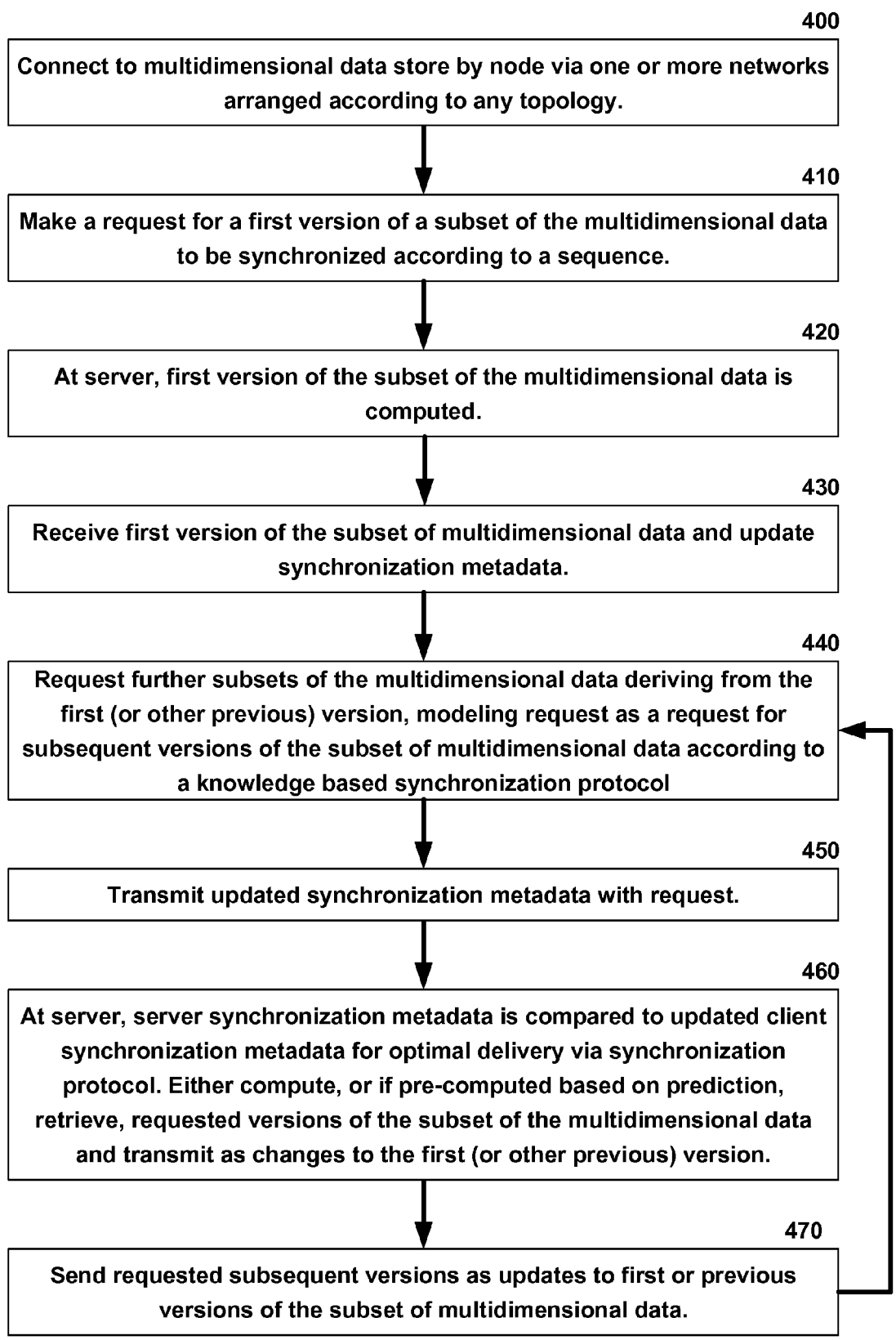
FIG. 4 is a flow diagram illustrating exemplary non-limiting synchronization of multidimensional data to a consuming client device.

FIG. 4 is a flow diagram of an exemplary synchronization exchange between a data center storing multidimensional data and a client consistent with the predictive synchronization based on knowledge as described in more detail below. At 400, a client node connects to a multidimensional data store via one or more networks arranged according to any network topology. At 410, the node makes a request for a first version of a subset of the multidimensional data to be synchronized according to a sequence. Then, at the server at 420, the first version of the subset of the multidimensional data is computed (or the first version may already be pre-computed from earlier client experiences).

At 430, the node then receives first version of the subset of multidimensional data and updates its synchronization metadata to reflect knowledge of the first version. Then, at 440, based on the notion that for certain kinds of data, such as a sequence of images or other streamed sequential data, further subsets of the multidimensional data are likely to derive from the first (or other previous) version. Thus, such requests can be modeled as requests for subsequent versions of the subset of multidimensional data according to a knowledge based synchronization protocol for use in a multimaster synchronization environment. At 450, the updated synchronization metadata of the client is transmitted to the server so that the server can determine what changes must be sent to the client based on its knowledge as compared to the server knowledge.

At the server at 460, the server synchronization metadata is thus compared to the updated client synchronization metadata for optimal delivery via the synchronization protocol predicated on knowledge metadata. In this regard, either the server computes the requested data, or if the data is pre-computed based on prediction, the data is retrieved. The requested versions of the subset of the multidimensional data are then transmitted as changes to the first (or other previous) version of the data at 470, and the process can repeat itself until the client experience is satisfied.

Since an optimal amount of data is sent over the networks, which is handled automatically by an efficient synchronization protocol for communicating synchronization metadata in a multimaster synchronization environment, the delivery of N-dimensional data as Y-dimensional data to a requesting client is simplified for clients requesting complex data that cannot be downloaded to a client in its entirety.

Efficient Knowledge Representation and Exchange

As a prelude to describing the techniques for synchronizing with multidimensional data in a knowledge based synchronization framework for a multi-master synchronization environment that employ prediction, in this section, an overview is presented of a general mechanism for efficiently representing knowledge in a data synchronization framework.

The general synchronization mechanism includes (1) an efficient exchange of knowledge between connected devices by requiring only the minimum data needed by a first node from a second node to be sent, (2) the ability to efficiently and correctly recognize disagreements over the state of data, i.e., conflicts, between a first node and a second node, (3) the ability to synchronize an arbitrary number of nodes and (4) the ability to synchronize any node via any other node, i.e., the ability to work in a peer to peer, multi-master synchronization environment.

With the general mechanism, any number of changes can be made to some information that is to be shared between the two devices. At any time they become connected, by exchanging their knowledge with one another, they become aware of at least the minimum amount of information needed to reconstruct what each other knows and does not know to facilitate of changes between the devices. It is noted that where more than two devices are involved, knowledge may be incomplete with respect to knowledge of a greater base of information to be shared, but as more knowledge is shared around the multiple devices, collective knowledge continues to be accrued by the devices as they connect to the other devices over time.

Advantageously, in various non-limiting embodiments, synchronization is performed for a set of devices, or a subset of devices, all interested in maintaining the latest versions of a set of objects, but also allows such devices to make conclusions about the different objects to which the devices may synchronize in the computing ecosystem. Whenever a device comes back into connection with other device(s) of the set of devices via one or more networks, the device regains collective knowledge that is as up to date as the other device(s) represent with their collective knowledge. In this fashion, even loosely connected devices may come into and out of contact with a set of devices, and then relearn all the knowledge missed by coming into contact with any set of devices that possess the latest set of collective knowledge.

Figure 5:
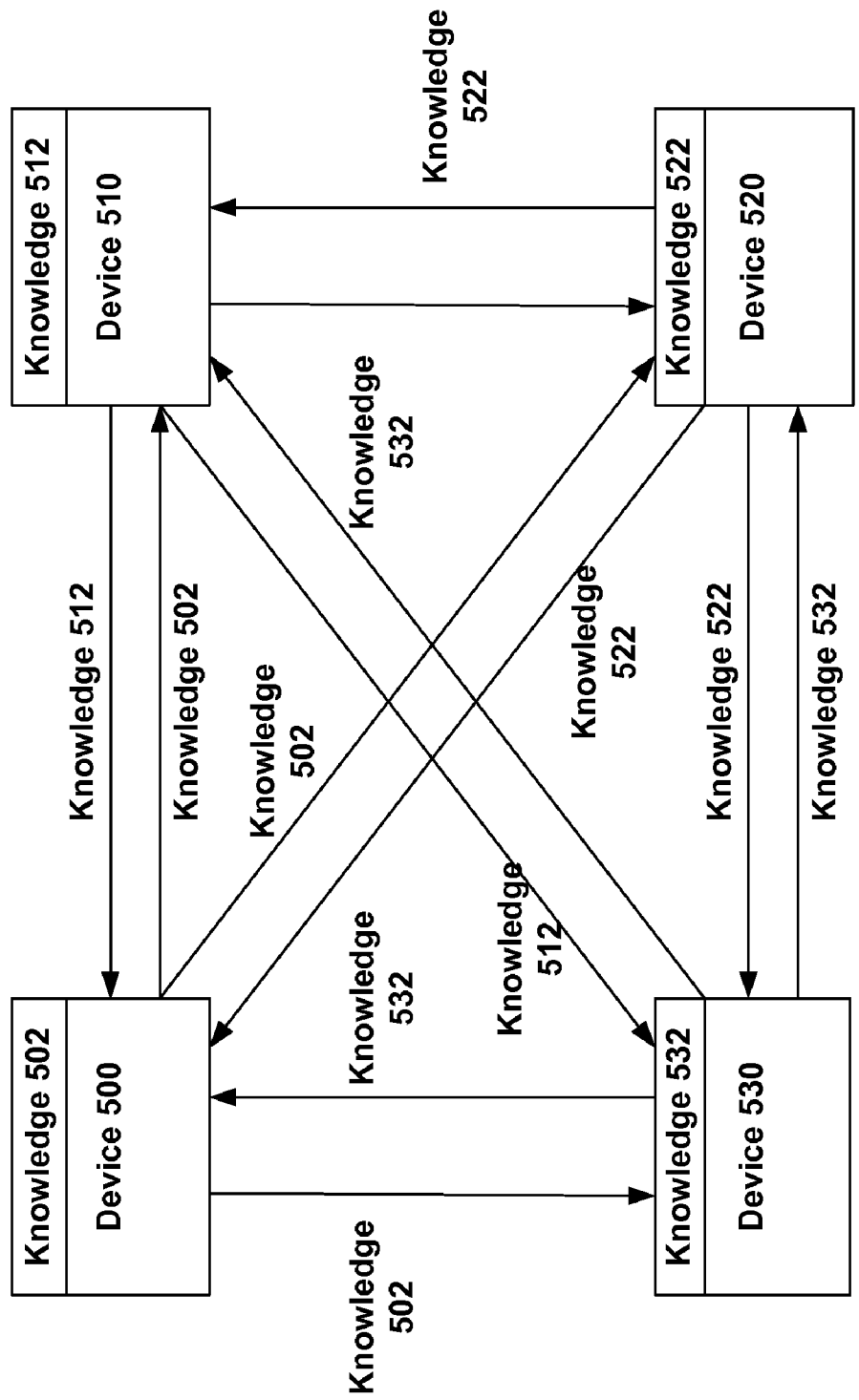
FIG. 5 illustrates exemplary non-limiting knowledge exchange between four nodes of a loosely connected network of nodes.

FIG. 5 illustrates that knowledge exchanges are generalizable, or scalable, to any number of devices. As shown, as a non-limiting number of devices, four devices 500, 510, 520 and 530 are shown with knowledge representations 502, 512, 522 and 532 that respectively indicate what each device knows and does not know about a set of common information to be shared across the devices.

Figure 6:
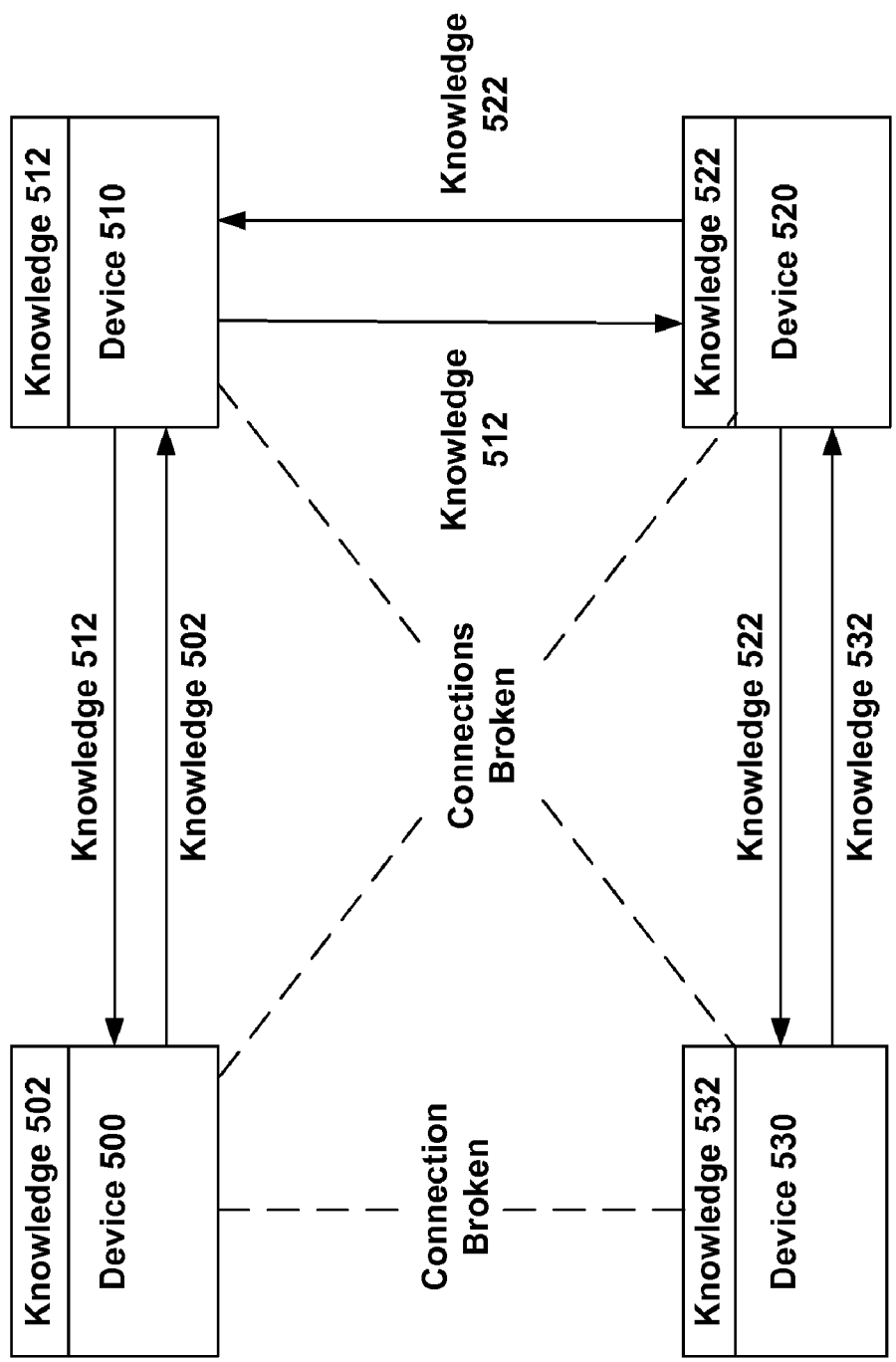
FIG. 6 illustrates exemplary non-limiting knowledge exchange between four nodes of a loosely connected network of nodes when some of the devices become disconnected from one another.

Advantageously, as shown by FIG. 6, even where connections in the network become disconnected, a complete set of knowledge can nonetheless be gained by all of the devices 500, 510, 520, and 530, as long as at least one connection directly or indirectly exists to the other devices. For instance, as shown, knowledge 532 of device 530 still reaches device 500 via the knowledge exchange with device 520, then via the knowledge exchange between device 520 and 510, and finally via the knowledge exchange between device 510 and 500.

With more devices sharing knowledge about common information to be shared, all of the devices benefit because knowledge exchange(s) in accordance with various non-limiting embodiments are agnostic about from which device collective knowledge comes. The devices each independently operate to try to gain as much knowledge about information to be shared among the devices from any of the other devices to which it is connected.

In exemplary non-limiting detail, a method is described in further detail for two nodes to engage in a conversation and at the end of the conversation to have equivalent knowledge for the concerned data set. The method is scalable beyond two nodes by creating a knowledge exchange capability for each new device entering the peer-to-peer network/multi-master environment.

Figure 7:
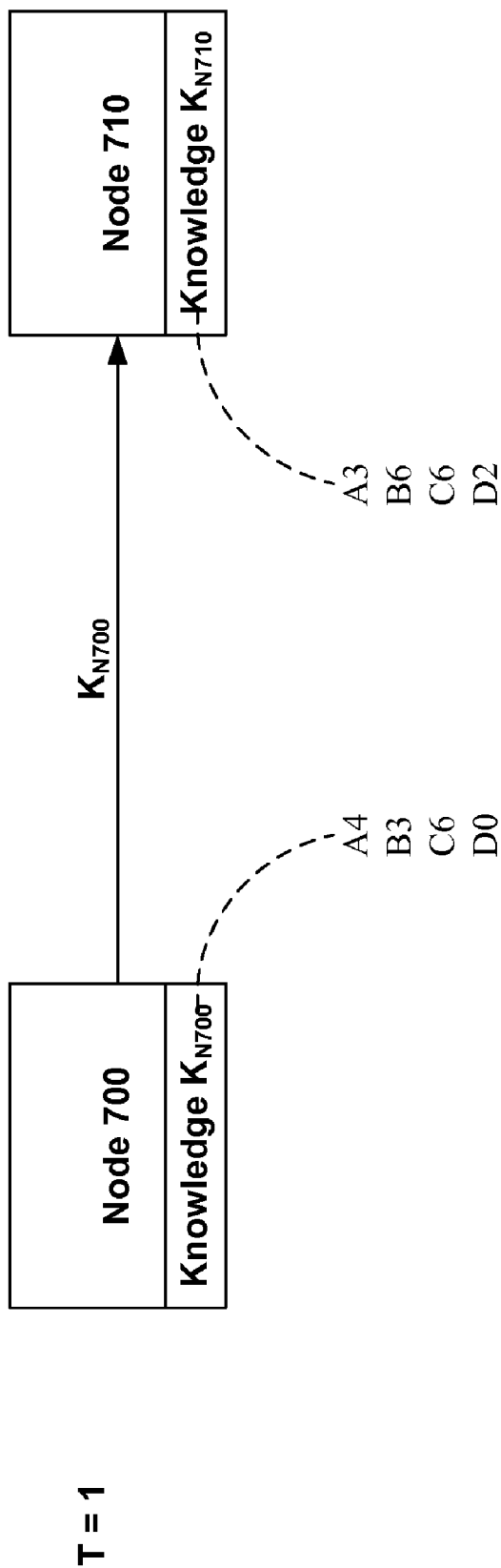
FIGS. 7, 8 and 9 illustrate exemplary knowledge exchange in the context of multiple objects shared among nodes of a network.

Thus, as shown in FIG. 7, node 700 of a peer-to-peer network having any number of nodes wants to exchange data with Node 710. Node A begins by requesting changes from Node 710 and in order to do so Node 700 sends its knowledge (represented as $K_{N700}$) to Node 710 as shown.

Knowledge of a device or node is represented by labeling each object to be shared among devices with a letter identifier, and then the trailing number represents the latest version for this object. For instance, $K_{N700}$ as shown in FIG. 7 includes objects A, B, C and D each to be synchronized between nodes 700 and 710, and the number following each of the objects represents the latest version of the object known on the device. For instance, knowledge $K_{N700}$ at a time t=1 includes the $5^{th}$ version of A, the $4^{th}$ version of B, the $7^{th}$ version of C, and the $1^{st}$ version of D, notated as A4, B3, C6, D0 in FIG. 7. In contrast, knowledge $K_{N710}$ of node 710 at a time t=1 may include the $4^{th}$ version of A, the $7^{th}$ version of B, the $7^{th}$ version of C, and the $3^{rd}$ version of D, notated as A3, B6, C6, D2 in FIG. 7.

Figure 8:
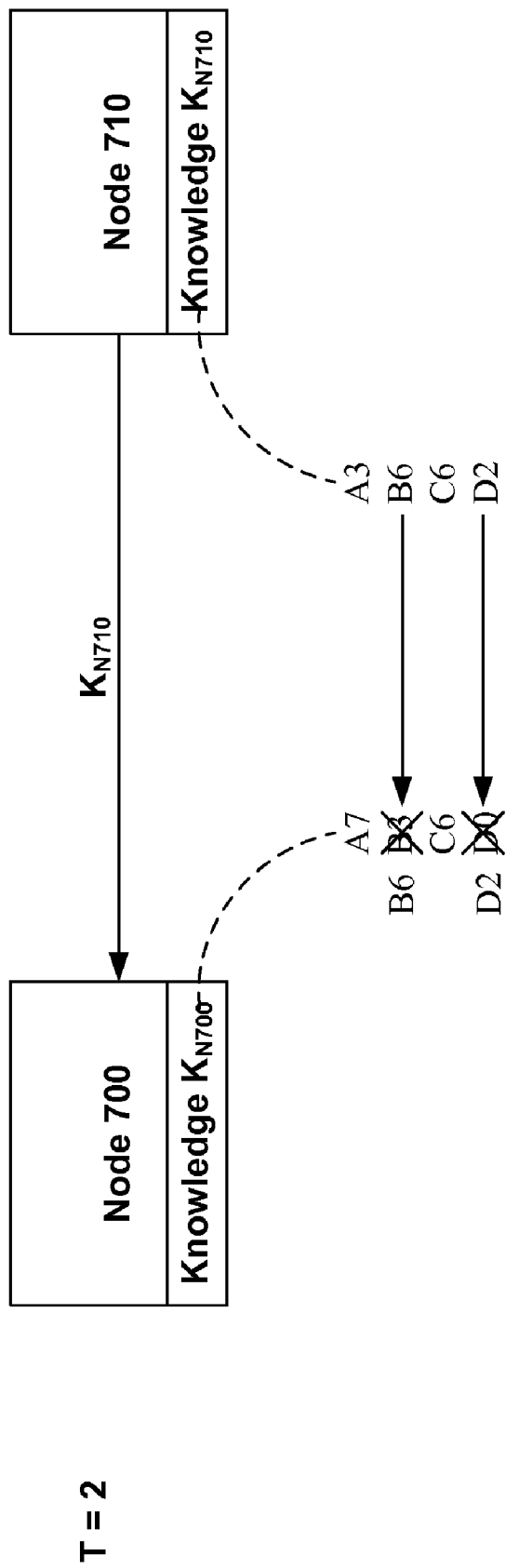

As shown in FIG. 8, at time T=2, node 710 compares knowledge $K_{N700}$ received from node 700 against its own knowledge $K_{N710}$ and determines what needs to be sent to node 700. In this example, as a result, node 710 will send node 700 the changes relating to B and D since node 700's knowledge of B3, D0 is behind node 710's knowledge of B6 and D2. When node 710 sends node 700 the changes between B6 and B3, and the changes between D2 and D0, it also sends along the latest version of knowledge $K_{N710}$ it has (reflecting whenever the last change on node 710 was made).

Figure 9:
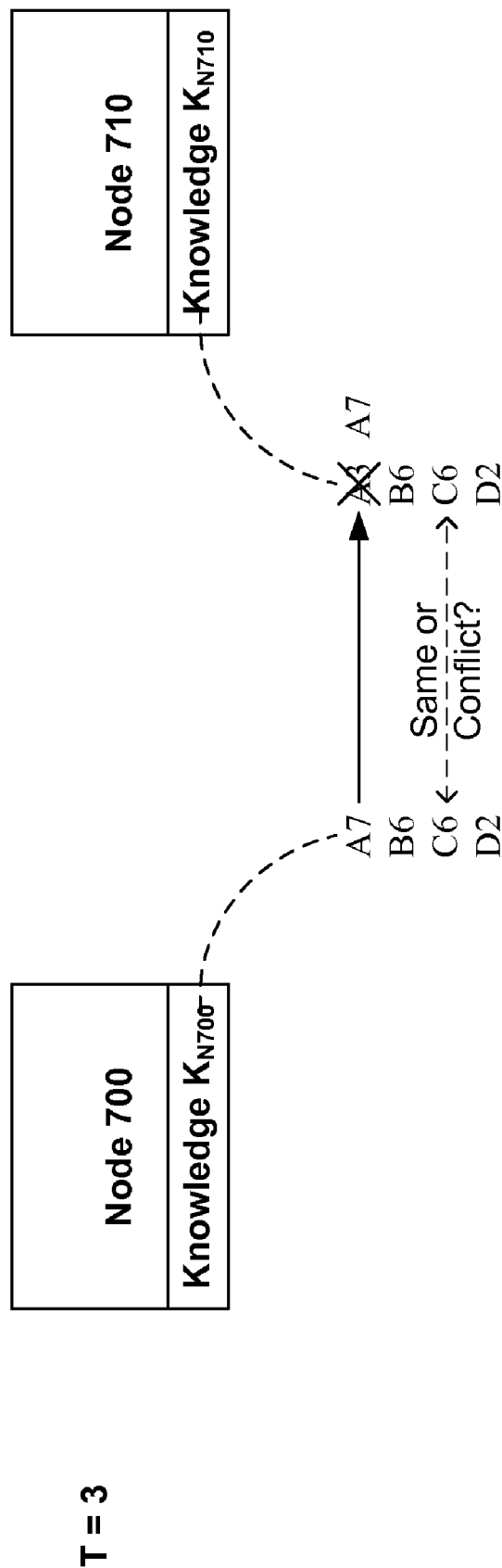

As shown in FIG. 9, representing time t=3, sending knowledge $K_{N710}$ to node 700 allows node 700 to detect conflicts (e.g., store them for later resolution) if it later finds out that both node 700 and node 710 made a change to an object while they were on the same version. This allows for autonomous updating, efficient enumeration, but also correct conflict detection when the nodes meet and exchange changes. For instance, in the example, if C6 is not the same object in both knowledge $K_{N710}$ and $K_{N710}$, e.g., if both independently evolved from C5 to C6, then which C6 is the correct C6 can be set aside for conflict resolution, e.g., according to pre-set policy resolution that befits the synchronization scenario and devices involved.

Figure 10:
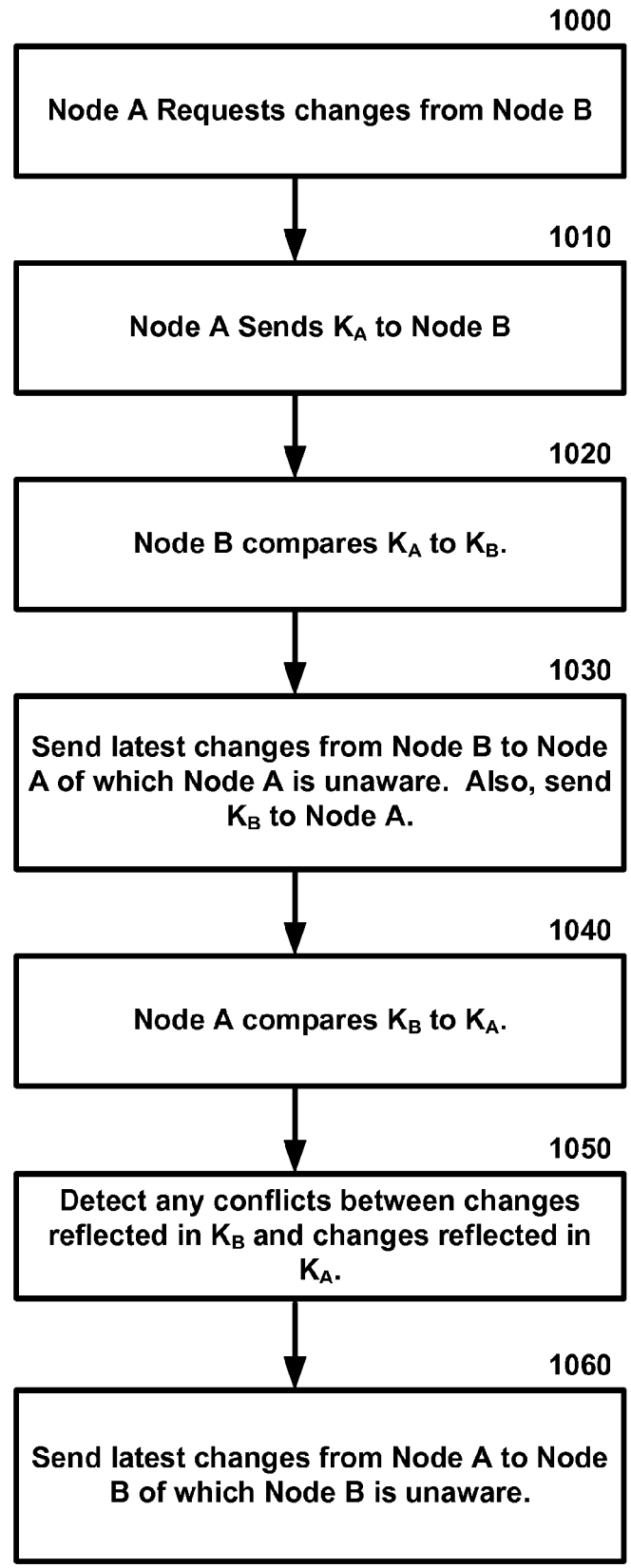
FIG. 10 is an exemplary non-limiting flow diagram illustrating the process for knowledge exchange in the context of multiple objects shared among nodes of a network.

An exemplary knowledge exchange process between any two nodes of a distributed multi-master synchronization environment using the above described general mechanism is shown in the flow diagram of FIG. 10. At 1000, node A requests synchronization with node B, thereby asking node B for changes node A does not know about. In order to equip node B, at 1010, node A sends its knowledge to node B. At 1020, node B compares the knowledge received from node A with its own knowledge to determine what changes node B knows about that should be sent to node A. At 1030, node B sends such changes to node A, and in addition, node B sends its knowledge to node A so that node A can perform a similar knowledge comparison at 1040.

At 1050, node A detects any potential conflicts between latest versions reflected in the knowledge of node B and latest versions reflected in the knowledge of node A, in the event that independent evolution of versions has occurred on node A and node B. Optionally, any conflict resolution policy may be applied to determine which node trumps the other node in the event of a conflict. At 1060, the latest changes from node A that are not possessed by node B are sent to node B. The conflict resolution policy will additionally dictate whether any changes are sent from node B to node A, or node A to node B, to maintain common information between the nodes. If independent versioning is OK, or desirable, no conflict resolution is another option.

Figure 11:
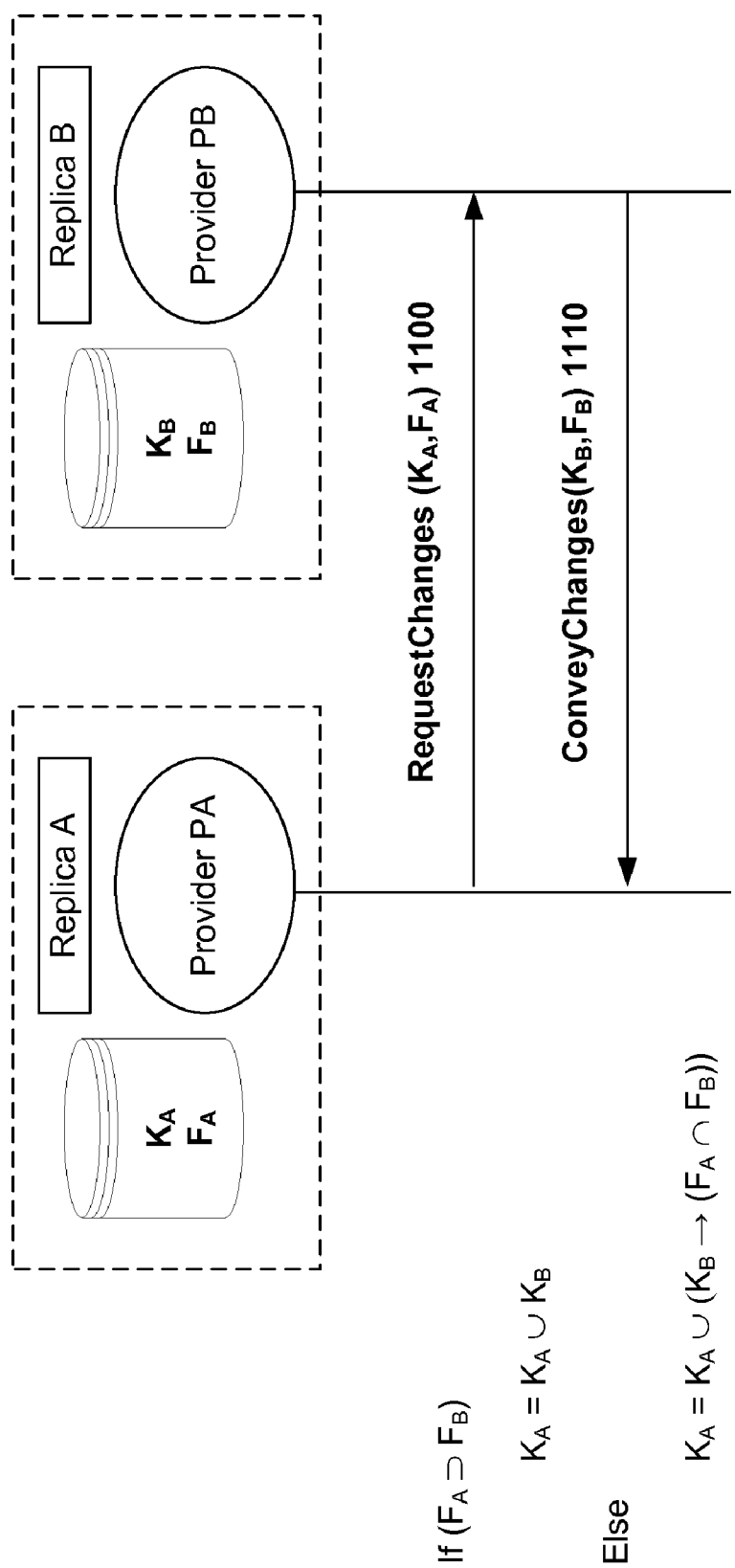
FIG. 11 is a general architecture illustrating the framework for requesting and conveying changes based on knowledge.

FIG. 11 illustrates the generalized mechanism for exchanging knowledge when filtered knowledge is possible, i.e., where a subset of a node's knowledge is to be synchronized with one or more of the other nodes. As shown, each replica A and B has a synchronization provider PA and provider PB, respectively. In this regard, each replica A and B maintains knowledge $K_A$ and $K_B$, respectively, and potentially also maintains filtered knowledge $F_A$ and $F_B$. Similar to the case with no subsetting, any of the replicas can request changes 1100 of another replica and receive changes 1110 in response to the other replica conveying changes. As illustrated, replica A can request changes for a set of objects of a given scope at 1100, sending its knowledge. Similarly, at 1110, based on an analysis of the knowledge $K_A$ and $K_B$, at 1110, the changes that replica B knows, but replica A does not know about, are sent to replica A for the objects. If the filtered knowledge $F_A$ and filtered knowledge $F_B$ are of the same scope, then as with the generalized knowledge exchange:

$$K_A = K_A \cup K_B$$

If the filtered knowledge $F_A$ and filtered knowledge $F_B$ are not of the same scope, then instead the knowledge is a function of existing knowledge plus the knowledge of the other replica as projected onto the intersection of their respective Filters $F_A$ and $F_B$, as follows:

$$K_A = K_A \cup (K_B \rightarrow (F_A \cap F_B))$$

Among other applications, an exemplary, non-limiting application for these types of filters is for filtering columns, or any change units of a synchronization framework. This is particularly applicable since column changes are not likely to be subject to move operations in the system. There are two considerations for this scenario worth noting: filter representation and knowledge consolidation.

With respect to filter representation, filter representation for the case of no move filters is as follows. Each filter is represented as a list of the change units contained within the filter. This representation provides a convenient means of representation as well as the ability to combine filters when necessary. The ability to combine filters is useful for consolidating knowledge.

With respect to knowledge consolidation, in order to keep knowledge in its most concise form the ability to consolidate knowledge must be maintained. In this regard, fragments of filtered knowledge can be consolidated so that knowledge can be maintained in its most compact form.

Considering the ability to combine filters, since filters can be represented as a set of change units, overlaps in filters can be reconciled by isolating the sets of change units that exist in both filters.

Also, since the vector for a filter applies to each of the individual change units within the filter, the combination of the filters can be performed by finding the combined vector for the change unit for each change unit in both filters. Then once all of the vectors are known, the change units that have a common vector are recombined into a new filter. Filters are thus one way to control what information is synchronized between devices.

Accordingly, the notion of knowledge can be used to efficiently represent data for knowledge exchanges among multiple nodes of a multi-master synchronization network, any node of which may independently evolve common information, or subsets of common information, to be synchronized across the nodes. The above-described knowledge based framework can be implemented for a multi-master synchronization environment and as described in more detail below, the framework is extendible to scenarios where large amounts of data is analyzed at a server and then derived data is streamed to a client in response to requests for the derived data according to an efficient exchange of synchronization metadata.

Knowledge Based Synchronization of Multidimensional Data

In various embodiments, efficient synchronization of Y-dimensional data by devices in a multi-master synchronization topology is provided where the Y-dimensional data is derived from large server stores of N-dimensional data. Prediction can be employed to transmit the next versions of a sequence of subsets of multidimensional data to consuming clients in an intuitive manner for a given application, e.g., on a probabilistic basis or based on past requests. In a non-limiting embodiment, applications that render 2-D images on the client of multidimensional objects (e.g., 3-D graphical objects) stored on the server are achieved through synchronizing versions of the 2-D images to the client including predictively providing versions of the 2-D images to the client.

An embodiment of the predictive multidimensional synchronization is illustrated in the flow diagram of FIG. 12. At 1200, the server node receives a request for version(s) of data derived from multidimensional data via a multimaster synchronization protocol including a knowledge exchange according to the above-described processes for exchanging synchronization metadata. At 1210, the synchronization knowledge from the requesting node and the server node is compared including a comparison of synchronization metadata representing corresponding versions for the data derived from the multidimensional data represented on the nodes.

At 1220, synchronization updates are transmitted to the node corresponding to the version(s) of the data requested and the node updates its synchronization knowledge. Optionally, at 1230, the next version(s) that are likely to be requested by the node in the future can be predicted and pre-computed, if not already computed, from the multidimensional data, so that those next version(s) are maximally ready to be synchronized to the node via the synchronization protocol at 1240.

Figure 13:
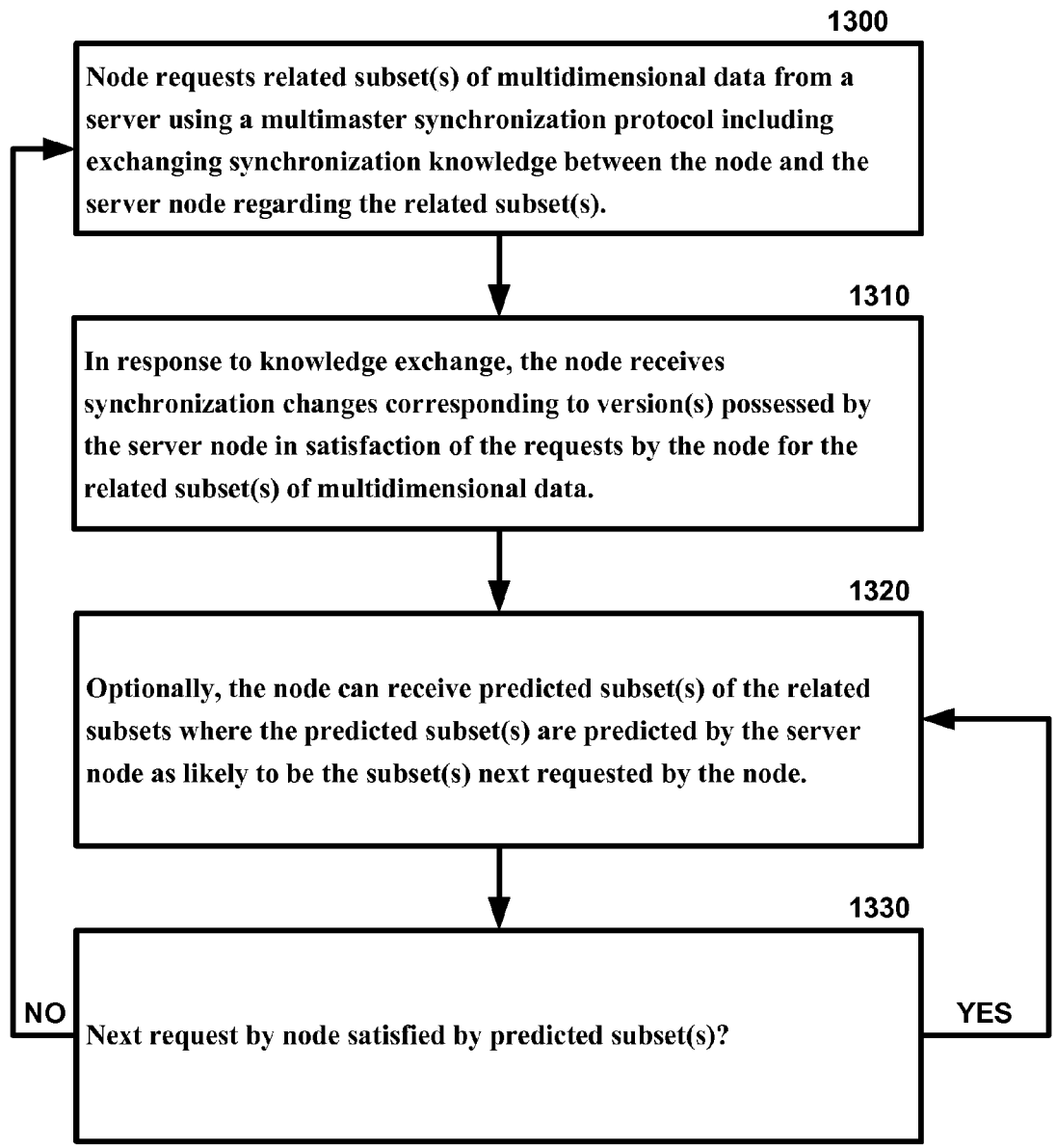

FIG. 13 illustrates another embodiment of the multi-master synchronization of N-dimensional data to Y-dimensional data. At 1300, initially, a node connects to the server node and requests related subset(s) of multidimensional data using a multimaster synchronization protocol that includes exchanging knowledge according to the knowledge framework discussed in the previous section with respect to the related subset(s). In response to knowledge exchange, at 1310, the node receives synchronization changes corresponding to version(s) possessed by the server node in satisfaction of the requests by the node for the related subset(s) of multidimensional data.

Then, optionally at 1320, the node can receive predicted subset(s) of the related subsets where the predicted subset(s) are predicted by the server node as likely to be the subset(s) next requested by the node. In this respect, if at 1330, the node determines that the predicted subset(s) cover the next request to be made by the node, the node need not perform additional synchronization at that time since such predicted subset(s) are ready for further action by the application of the node. If, however, the next request is not satisfied by the predicted subset(s), the flow returns to 1300 for a request by the node for further subset(s) of the data derived from the multidimensional data.

Figure 14:
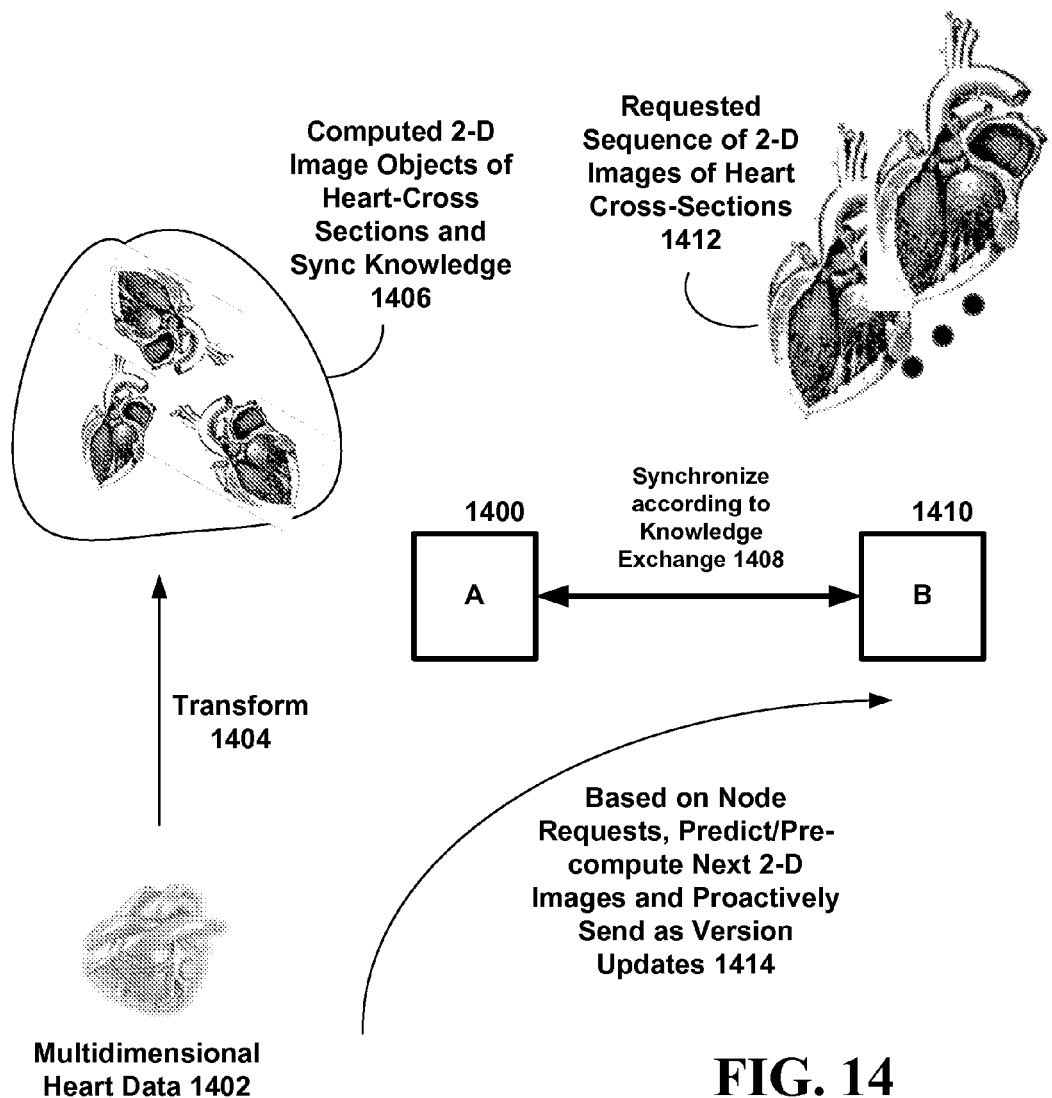
FIG. 14 is an illustration of a representative scenario that may utilize the effective transmission of subsets of multidimensional data via synchronization with respect to image data.

FIG. 14 is a block diagram of a practical application of the synchronization of Y-dimensional data from N-dimensional data described herein. In this regard, one can appreciate the explosion of large stores of massive amounts of data of all types along with advances in cost, speed and size of data storage hardware. However, not all requesting nodes can maintain massive data cubes locally, particularly when any given node will only be interested in a small subset of usually tailored data for the node based on narrow requests. An example of this might be with respect to patient data, e.g., X-ray data of patients' hearts in three or more dimension 1402 stored by servers 1400.

One can further appreciate that any given node 1410, say located at a local doctor's office, may want to pull up a small subset of multidimensional data 1402, e.g., some 2-D images related to a particular cross-section of a particular patient's heart. With the embodiments described herein, node 1410 requests synchronization of subsets of data from multidimensional data 1402 and transforms the data 1402 with a transform 1404 to Y-dimensional data and corresponding sync knowledge 1406, here 2-D image objects representing some particular heart shaped cross sections.

At the requesting node 1410, one or more of these objects 1406 may be requested and the exchange of data can take place according to synchronization with a knowledge exchange 1408 as described in more detail in the previous section. Since the sequence of heart images requested by the client are related, the changes from image to image can be modeled as synchronization changes between versions, and thus the sequence can be modeled efficiently. In addition, as the requests from the node 1410 regarding next versions of the heart images continue to arrive from the node 1410, the server 1400 can anticipate what next versions the node 1410 will want.

For instance, if the first image displayed on node 1410 is at a first eyepoint angle to the heart, the second is at a second eyepoint angle 5 degrees to the right and the third is at a third eyepoint angle another 5 degrees to the right, the server 1400 can predict what the next images will be that are likely to be requested by the node 1410. While server 1400 will not always be correct about the next item to be requested by client 1410, being right most of the time will produce a large efficiency in terms of the client 1410 being able to meet time sensitive requirements for processing or display of data. Thus, based on node requests, the next 2-D Images can be predicted/pre-computed and proactively sent as version updates at 1414.

From the perspective of the doctor at the local office, the images thus look like discreet and independent sequence of images 1412; however, synchronization with the multimaster synchronization protocol predicated on knowledge as described herein enables efficient representation of the series of related images as versions of subsets of the overall heart data, in a way that avoids expensive whole images across the network. For the avoidance of doubt, this health care example is but one of limitless scenarios that can benefit from this predictive transmission model for synchronizing with various subsets of large bodies of multidimensional data.

Figure 15:
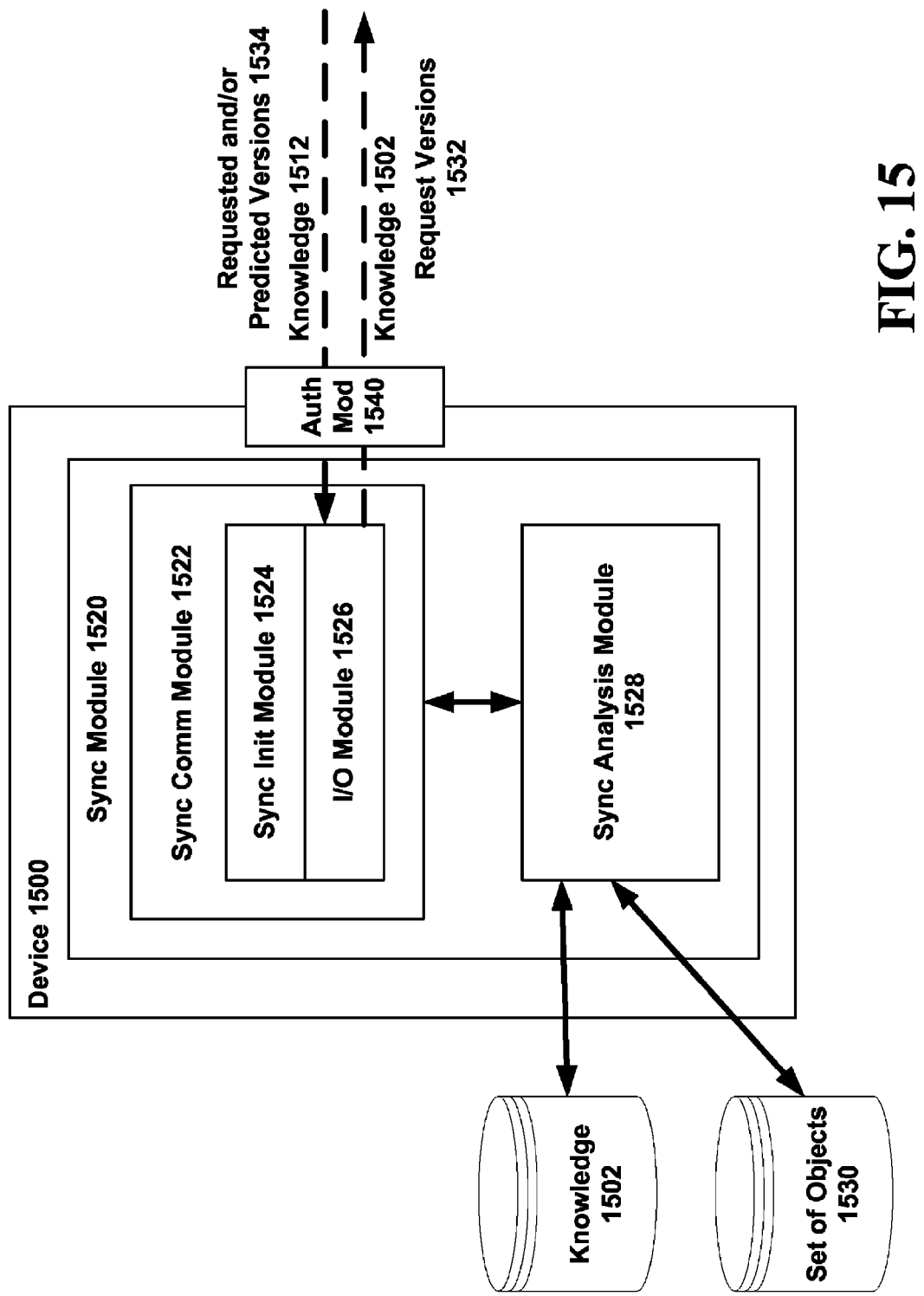
FIG. 15 is a block diagram of an exemplary non-limiting implementation of a device for performing a knowledge exchange with another node via a common set of APIs.

FIG. 15 is a block diagram of an exemplary non-limiting implementation of a device 1500 for performing a full or partial knowledge exchange via a set of APIs. As shown, device 1500 includes a sync module 1520 that performs knowledge exchange techniques for synchronizing a set of objects 1530 with another device in accordance with non-limiting embodiments. The set of objects 1530 can also be stored in a cache (not shown) for efficient operations, and then set of objects 1530 can be later updated by offline applications. Sync module 1520 may include a sync communications module 1522 for generally transmitting and receiving data in accordance with knowledge exchange techniques to and from other nodes as described herein.

Sync communications module 1522 may also include a sync initiation module 1524 which may initiate synchronization with a second device if authorized, e.g., via optional authorization module 1540, and connect to the second device. Sync module 1522 may also include an I/O module 1526 responsive to the initiation of synchronization by sending full and/or partial knowledge 1502 about the set of objects 1530 to a second device via APIs, e.g., for getting or sending knowledge or for getting or sending changes. Similarly, I/O module 1526 can receive requested knowledge or changes 1512 of the second device and changes to be made to the set of objects 1530 originating from the second device. In turn, a sync analysis module 1528 operates to apply any changes to be made to the set of objects 1530 and to compare knowledge 1512 received from the second device with the knowledge 1502 of the first device in order to determine changes to be made locally or to send to the second device to complete synchronization between the devices.

In accordance with embodiments herein, exchange of knowledge 1502 and 1512 takes place with respect to requests 1532 for version(s) of subsets of multi-dimensional data, such that the synchronization protocol handles efficient transmission of synchronization updates that satisfy the requests with versions 1534. In addition, the versions 1534 can include predicted versions which are likely to satisfy a request to be made in the near future.

Thus, as described herein, various embodiments provide synchronization techniques for synchronizing with multidimensional data in a knowledge based synchronization framework for a multi-master synchronization environment. Prediction can be employed to transmit the next versions of a sequence of subsets of multidimensional data to consuming clients in an intuitive manner for a given application, e.g., on a probabilistic basis or based on past requests. In a non-limiting embodiment, applications that render 2-D images on the client of multidimensional objects (e.g., 3-D graphical objects) stored on the server are achieved through synchronizing versions of the 2-D images to the client including predictively providing versions of the 2-D images to the client.

Advantageously, the techniques for synchronizing Y-dimensional data derived from N-dimensional data according to the above described synchronization framework can be extended in a way that allows a definition of quality of one or more objects of the synchronized data for purposes of a knowledge exchange. Thus, in addition to predicting a next version of Y-dimensional data to display based on previous images, a next version of Y-dimensional data can represent a change in quality of data, e.g., to anticipate level of detail changes as a graphical object is zoomed in and out, to predict MIP-Mapping techniques, for predictive complex texturing and surfacing, and the like.

Accordingly, in one non-limiting embodiment, additional dimension(s) can be placed on a knowledge vector for a given version of an object that represent incremental quality information for the version of the object, which is accounted for during the synchronization process to allow nodes to decide what types of qualities of objects should be conveyed to them as part of the synchronization process, and to predict subsequent versions based on likely next versions of different quality.

For instance, objects having qualities that are not desirable to a node can be tombstoned to avoid future synchronization with respect to such objects maintained by other nodes in the multi-master synchronization environment. In other embodiments, where a change to an object is non-destructive (as decided by a node), the current version of the object is enhanced to reflect another version of the current version, i.e., a version representing the quality level of the changed object. If the change is regarded as destructive, the new version is reflected by the synchronization metadata.

Exemplary Networked and Distributed Environments

One of ordinary skill in the art can appreciate that the various embodiments of the synchronization infrastructure described herein can be implemented in connection with any computer or other client or server device, which can be deployed as part of a computer network or in a distributed computing environment, and can be connected to any kind of data store. In this regard, the various embodiments described herein can be implemented in any computer system or environment having any number of memory or storage units, and any number of applications and processes occurring across any number of storage units. This includes, but is not limited to, an environment with server computers and client computers deployed in a network environment or a distributed computing environment, having remote or local storage.

Distributed computing provides sharing of computer resources and services by communicative exchange among computing devices and systems. These resources and services include the exchange of information, cache storage and disk storage for objects, such as files. These resources and services also include the sharing of processing power across multiple processing units for load balancing, expansion of resources, specialization of processing, and the like. Distributed computing takes advantage of network connectivity, allowing clients to leverage their collective power to benefit the entire enterprise. In this regard, a variety of devices may have applications, objects or resources that may use the synchronization infrastructure as described for various embodiments of the subject disclosure.

Figure 16:
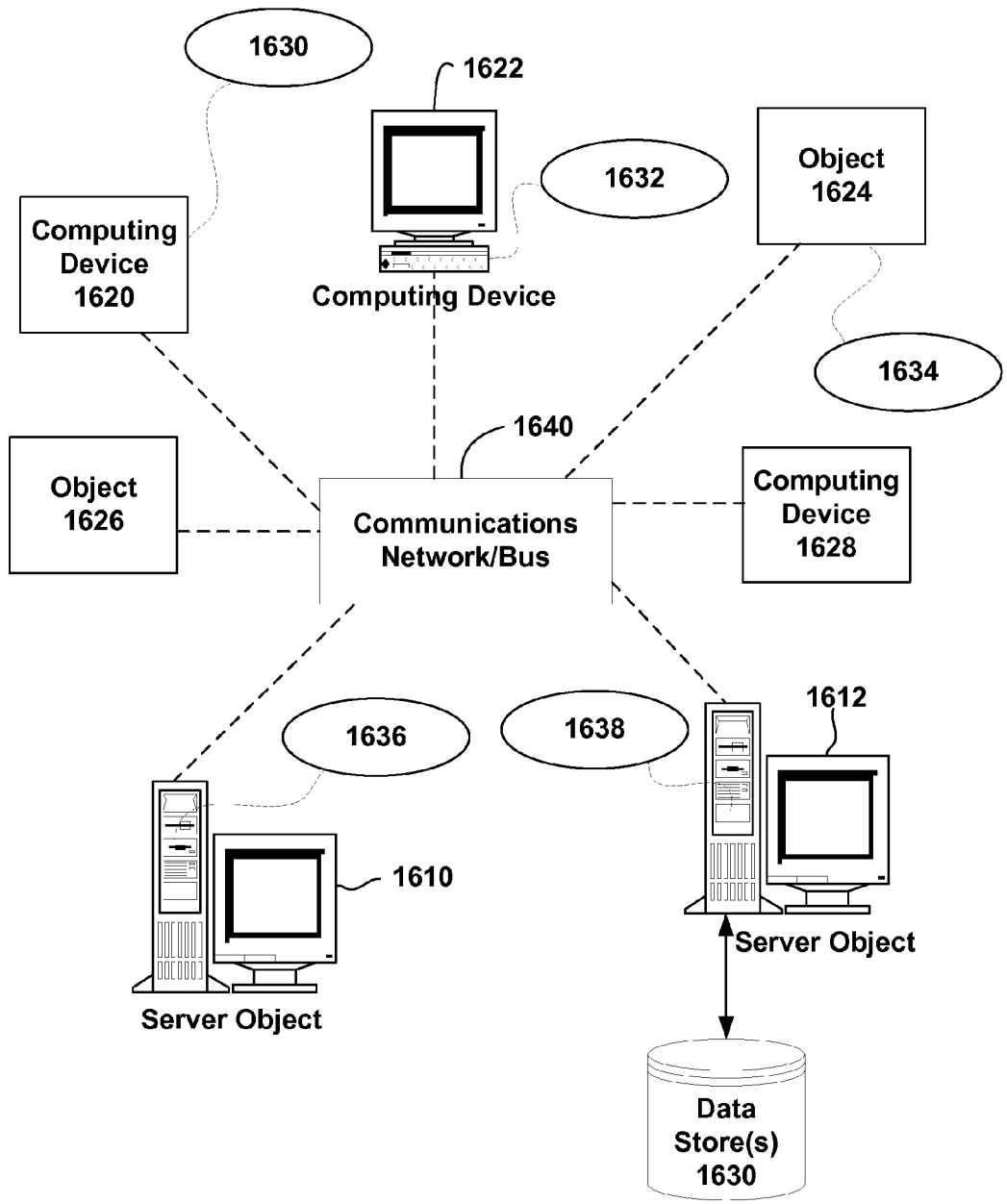
FIG. 16 is a block diagram representing exemplary non-limiting networked environments in which various embodiments described herein can be implemented.

FIG. 16 provides a schematic diagram of an exemplary networked or distributed computing environment. The distributed computing environment comprises computing objects 1610, 1612, etc. and computing objects or devices 1620, 1622, 1624, 1626, 1628, etc., which may include programs, methods, data stores, programmable logic, etc., as represented by applications 1630, 1632, 1634, 1636, 1638. It can be appreciated that objects 1610, 1612, etc. and computing objects or devices 1620, 1622, 1624, 1626, 1628, etc. may comprise different devices, such as PDAs, audio/video devices, mobile phones, MP3 players, personal computers, laptops, etc.

Each object 1610, 1612, etc. and computing objects or devices 1620, 1622, 1624, 1626, 1628, etc. can communicate with one or more other objects 1610, 1612, etc. and computing objects or devices 1620, 1622, 1624, 1626, 1628, etc. by way of the communications network 1640, either directly or indirectly. Even though illustrated as a single element in FIG. 16, network 1640 may comprise other computing objects and computing devices that provide services to the system of FIG. 16, and/or may represent multiple interconnected networks, which are not shown. Each object 1610, 1612, etc. or 1620, 1622, 1624, 1626, 1628, etc. can also contain an application, such as applications 1630, 1632, 1634, 1636, 1638, that might make use of an API, or other object, software, firmware and/or hardware, suitable for communication with or implementation of the synchronization infrastructure provided in accordance with various embodiments of the subject disclosure.

There are a variety of systems, components, and network configurations that support distributed computing environments. For example, computing systems can be connected together by wired or wireless systems, by local networks or widely distributed networks. Currently, many networks are coupled to the Internet, which provides an infrastructure for widely distributed computing and encompasses many different networks, though any network infrastructure can be used for exemplary communications made incident to the synchronization infrastructure as described in various embodiments.

Thus, a host of network topologies and network infrastructures, such as client/server, peer-to-peer, or hybrid architectures, can be utilized. The "client" is a member of a class or group that uses the services of another class or group to which it is not related. A client can be a process, i.e., roughly a set of instructions or tasks, that requests a service provided by another program or process. The client process utilizes the requested service without having to "know" any working details about the other program or the service itself.

In a client/server architecture, particularly a networked system, a client is usually a computer that accesses shared network resources provided by another computer, e.g., a server. In the illustration of FIG. 16, as a non-limiting example, computers 1620, 1622, 1624, 1626, 1628, etc. can be thought of as clients and computers 1610, 1612, etc. can be thought of as servers where servers 1610, 1612, etc. provide data services, such as receiving data from client computers 1620, 1622, 1624, 1626, 1628, etc., storing of data, processing of data, transmitting data to client computers 1620, 1622, 1624, 1626, 1628, etc., although any computer can be considered a client, a server, or both, depending on the circumstances. Any of these computing devices may be processing data, synchronizing or requesting services or tasks that may implicate the synchronization infrastructure as described herein for one or more embodiments.

A server is typically a remote computer system accessible over a remote or local network, such as the Internet or wireless network infrastructures. The client process may be active in a first computer system, and the server process may be active in a second computer system, communicating with one another over a communications medium, thus providing distributed functionality and allowing multiple clients to take advantage of the information-gathering capabilities of the server. Any software objects utilized pursuant to the synchronization infrastructure can be provided standalone, or distributed across multiple computing devices or objects.

In a network environment in which the communications network/bus 1640 is the Internet, for example, the servers 1610, 1612, etc. can be Web servers with which the clients 1620, 1622, 1624, 1626, 1628, etc. communicate via any of a number of known protocols, such as the hypertext transfer protocol (HTTP). Servers 1610, 1612, etc. may also serve as clients 1620, 1622, 1624, 1626, 1628, etc., as may be characteristic of a distributed computing environment.

Exemplary Computing Device

As mentioned, advantageously, the techniques described herein can be applied to any device where it is desirable to synchronize with other objects in a computing system. It should be understood, therefore, that handheld, portable and other computing devices and computing objects of all kinds are contemplated for use in connection with the various embodiments, i.e., anywhere that a device may synchronize. Accordingly, the below general purpose remote computer described below in FIG. 17 is but one example of a computing device.

Although not required, embodiments can partly be implemented via an operating system, for use by a developer of services for a device or object, and/or included within application software that operates to perform one or more functional aspects of the various embodiments described herein. Software may be described in the general context of computer-executable instructions, such as program modules, being executed by one or more computers, such as client workstations, servers or other devices. Those skilled in the art will appreciate that computer systems have a variety of configurations and protocols that can be used to communicate data, and thus, no particular configuration or protocol should be considered limiting.

Figure 17:
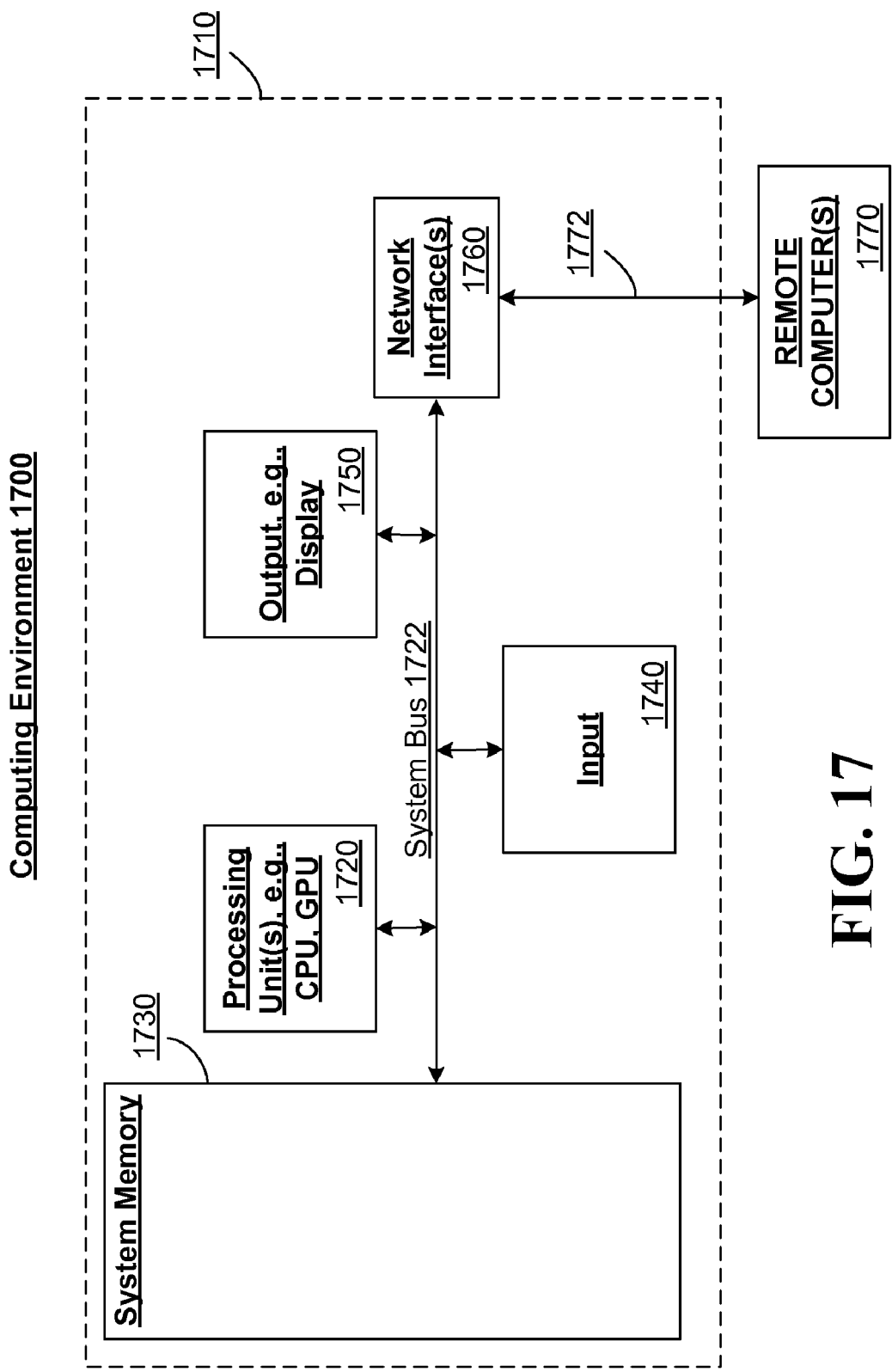
FIG. 17 is a block diagram representing an exemplary non-limiting computing system or operating environment in which one or more aspects of various embodiments described herein can be implemented.

FIG. 17 thus illustrates an example of a suitable computing system environment 1700 in which one or aspects of the embodiments described herein can be implemented, although as made clear above, the computing system environment 1700 is only one example of a suitable computing environment and is not intended to suggest any limitation as to scope of use or functionality. Neither should the computing environment 1700 be interpreted as having any dependency or requirement relating to any one or combination of components illustrated in the exemplary operating environment 1700.

With reference to FIG. 17, an exemplary remote device for implementing one or more embodiments includes a general purpose computing device in the form of a computer 1710. Components of computer 1710 may include, but are not limited to, a processing unit 1720, a system memory 1730, and a system bus 1722 that couples various system components including the system memory to the processing unit 1720.

Computer 1710 typically includes a variety of computer readable media and can be any available media that can be accessed by computer 1710. The system memory 1730 may include computer storage media in the form of volatile and/or nonvolatile memory such as read only memory (ROM) and/or random access memory (RAM). By way of example, and not limitation, memory 1730 may also include an operating system, application programs, other program modules, and program data.

A user can enter commands and information into the computer 1710 through input devices 1740. A monitor or other type of display device is also connected to the system bus 1722 via an interface, such as output interface 1750. In addition to a monitor, computers can also include other peripheral output devices such as speakers and a printer, which may be connected through output interface 1750.

The computer 1710 may operate in a networked or distributed environment using logical connections to one or more other remote computers, such as remote computer 1770. The remote computer 1770 may be a personal computer, a server, a router, a network PC, a peer device or other common network node, or any other remote media consumption or transmission device, and may include any or all of the elements described above relative to the computer 1710. The logical connections depicted in FIG. 17 include a network 1772, such local area network (LAN) or a wide area network (WAN), but may also include other networks/buses. Such networking environments are commonplace in homes, offices, enterprise-wide computer networks, intranets and the Internet.

As mentioned above, while exemplary embodiments have been described in connection with various computing devices and network architectures, the underlying concepts may be applied to any network system and any computing device or system in which it is desirable to synchronize.

Also, there are multiple ways to implement the same or similar functionality, e.g., an appropriate API, tool kit, driver code, operating system, control, standalone or downloadable software object, etc. which enables applications and services to use the synchronization infrastructure. Thus, embodiments herein are contemplated from the standpoint of an API (or other software object), as well as from a software or hardware object that provides synchronization capabilities. Thus, various embodiments described herein can have aspects that are wholly in hardware, partly in hardware and partly in software, as well as in software.

The word "exemplary" is used herein to mean serving as an example, instance, or illustration. For the avoidance of doubt, the subject matter disclosed herein is not limited by such examples. In addition, any aspect or design described herein as "exemplary" is not necessarily to be construed as preferred or advantageous over other aspects or designs, nor is it meant to preclude equivalent exemplary structures and techniques known to those of ordinary skill in the art. Furthermore, to the extent that the terms "includes," "has," "contains," and other similar words are used in either the detailed description or the claims, for the avoidance of doubt, such terms are intended to be inclusive in a manner similar to the term "comprising" as an open transition word without precluding any additional or other elements.

The term "limited quality" shall refer to a restriction on existence of an object in a synchronizing system such that the start and/or end of existence of the object is restricted.

As mentioned, the various techniques described herein may be implemented in connection with hardware or software or, where appropriate, with a combination of both. As used herein, the terms "component," "system" and the like are likewise intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on computer and the computer can be a component. One or more components may reside within a process and/or thread of execution and a component may be localized on one computer and/or distributed between two or more computers.

The aforementioned systems have been described with respect to interaction between several components. It can be appreciated that such systems and components can include those components or specified sub-components, some of the specified components or sub-components, and/or additional components, and according to various permutations and combinations of the foregoing. Sub-components can also be implemented as components communicatively coupled to other components rather than included within parent components (hierarchical). Additionally, it should be noted that one or more components may be combined into a single component providing aggregate functionality or divided into several separate sub-components, and that any one or more middle layers, such as a management layer, may be provided to communicatively couple to such sub-components in order to provide integrated functionality. Any components described herein may also interact with one or more other components not specifically described herein but generally known by those of skill in the art.

In view of the exemplary systems described supra, methodologies that may be implemented in accordance with the described subject matter will be better appreciated with reference to the flowcharts of the various figures. While for purposes of simplicity of explanation, the methodologies are shown and described as a series of blocks, it is to be understood and appreciated that the claimed subject matter is not limited by the order of the blocks, as some blocks may occur in different orders and/or concurrently with other blocks from what is depicted and described herein. Where non-sequential, or branched, flow is illustrated via flowchart, it can be appreciated that various other branches, flow paths, and orders of the blocks, may be implemented which achieve the same or a similar result. Moreover, not all illustrated blocks may be required to implement the methodologies described hereinafter.

In addition to the various embodiments described herein, it is to be understood that other similar embodiments can be used or modifications and additions can be made to the described embodiment(s) for performing the same or equivalent function of the corresponding embodiment(s) without deviating therefrom. For instance, consistent with diversity of server architectures, large compilations of multi-dimensional data come in many shapes and sizes, and can be centralized or distributed across a variety interconnected storage components. Still further, multiple processing chips or multiple devices can share the performance of one or more functions described herein, and similarly, storage can be effected across a plurality of devices. Accordingly, the invention should not be limited to any single embodiment or set of embodiments, but rather should be construed in breadth, spirit and scope in accordance with the appended claims.

What is claimed is:

1. A method for synchronizing versions of data derived from multidimensional data of a server node to a node of a plurality of nodes via one or more networks in a multi-master synchronization environment, comprising:

receiving a request, from the node, for at least one version of data derived from the multidimensional data via a multimaster synchronization protocol including receiving synchronization knowledge from the node including synchronization metadata representing corresponding versions for the data derived from the multidimensional data represented on the node, wherein representation of the synchronization knowledge is independent of data type;

comparing the synchronization knowledge from the node with synchronization knowledge of the server node including synchronization metadata representing corresponding versions for the data represented on the server node;

based on the comparing, transmitting synchronization updates to the node corresponding to the at least one version of the data requested by the node to model a delivery of N-dimensional data as Y-dimensional data;

predictively determining at least one next version corresponding to the synchronization updates that is likely to be requested by the node after requesting the at least one version of the data requested by the node; and based on the predictively determining, performing a transform of the at least one version of the data corresponding to the synchronization updates requested by the node from an N-dimensional representation to a Y-dimensional representation, wherein N is an integer different than Y.

2. The method of claim 1, wherein the predictively determining includes pre-computing the at least one next version from the multidimensional data.

3. The method of claim 1, wherein the predictively determining includes predictively determining at least one next version having a different qualitative characteristic from the at least one version of the data requested by the node.

4. The method of claim 1, further comprising:

transmitting, according to the multimaster synchronization protocol, the at least one next version of the data to the node without waiting for a request for the at least one next version from the node.

5. A node device of a plurality of nodes connectable via one or more networks that synchronizes a set of Y-dimensional objects between the node and another node of the plurality of nodes in a multi-master synchronization environment, the node device including at least one processor coupled to a machine-readable non-transitory storage medium, wherein the set of Y-dimensional objects are each a version computed from multidimensional data, comprising:

a synchronization component configured to, in response to an application or service initiating at least one request for a set of Y-dimensional objects from the other node, to model a delivery of N-dimensional data as Y-dimensional data, N being a different integer than Y, where the set of Y-dimensional objects are derived from N-dimensional data on the other node, synchronize between the node and the other node of the plurality of nodes with respect to the Y-dimensional objects requested by the application or service, the synchronization component including:

a synchronization communications component configured to initiate synchronization with the other node via a multimaster synchronization protocol that defines, independent of data type, metadata structure for a knowledge exchange between the other node and the node regarding the set of Y-dimensional objects, to transmit to the other node a request to synchronize with at least one of the requested Y-dimensional objects based on the synchronization protocol, and to receive external knowledge of the set of Y-dimensional objects from the other node in response including other node object versioning information corresponding to the set of Y-dimensional objects represented on the other node, wherein the requested Y-dimensional objects are generated by the other node from the N-dimensional data where the other node has no prior knowledge of the requested Y-dimensional objects; and a synchronization analysis component configured to update local knowledge of the set of Y-dimensional objects represented on the node and corresponding node object versioning information by comparing the external knowledge of the set of Y-dimensional objects including the corresponding other node object versioning information and corresponding node object versioning information to determine what changes should be reflected by updated local knowledge of the set of Y-dimensional objects and corresponding node object first versioning information; and wherein the node device is configured to receive a next likely Y-dimensional object of the set of Y-dimensional objects based on an analysis from a synchronization prediction component of previous successive at least two requests for Y-dimensional objects made by the application or service, whereby the next likely Y-dimensional object is predictively pre-computed by the other node based on the analysis of the previous successive at least two requests.

6. The node device of claim 5, wherein the next likely Y-dimensional object of the set of Y-dimensional objects corresponds to image data to display one of multiple turns of a predetermined degree in an image.

7. The node device of claim 5, wherein, for each object of the set of Y-dimensional objects represented by the updated local knowledge having corresponding node object versioning information, the synchronization analysis component is configured to compare versioning information represented on the node device and other node for a given Y-dimensional object to determine whether a given version represented by the versioning information is desirable to synchronize to the node.

8. The node device of claim 5, wherein the synchronization protocol does not prescribe any schema of the actual Y-dimensional object data being synchronized between the node device and the other node.

9. The node device of claim 5, wherein the Y-dimensional objects represent a transform of at least one of geological data to image data or statistical data to business logic.

10. The node device of claim 5, wherein N is a greater integer than Y.

11. The node device of claim 5, wherein the multidimensional data is health care related anatomical data.

12. A method for synchronizing related subsets of multidimensional data from a server node to a node via one or more networks in a multi-master synchronization environment, comprising:

requesting, by the node, at least one subset of the related subsets of the multidimensional data from the server node using a multimaster synchronization protocol including exchanging synchronization knowledge between the node and the server node of the subsets of the related subsets of multidimensional data represented on both nodes, wherein synchronization knowledge of the node and the server node includes synchronization metadata representing corresponding versions for the at least one subset of the related subsets of multidimensional data represented on the node and server node, respectively, and wherein representation of the synchronization knowledge is independent of multidimensional data type;

based on the exchanging of synchronization knowledge, receiving, by the node synchronization changes corresponding to at least one version of the at least one subset of the related subsets of multidimensional data requested by the node, the synchronization changes corresponding to a transform from an N-dimensional form to a Y-dimensional form, N being a different integer than Y;

requesting a next subset of the related subsets by the node;

receiving the next subset as synchronization changes corresponding to at least one version of the at least one subset of the related subsets of multidimensional data; and receiving a predicted subset of the related subsets by the node where the predicted subset is predicted by the server node as likely to be the subset after the requested next subset based on at least one criterion.

13. The method of claim 12, further comprising:
displaying a sequence of images rotated by a predetermined angle, the sequence of images corresponding to at least one of the related subsets.

14. The method of claim 13, wherein the receiving of the predicted subset includes receiving a subset of a different quality than the requested at least one subset based on the at least one criterion.

15. The method of claim 13, wherein the receiving of the predicted subset of the related subsets includes receiving a predicted version of a subset of the related subsets as synchronization changes to an existing version represented on the node.

16. The method of claim 13, further comprising:
receiving a predicted image of a related images requested by the node from the multidimensional data where the predicted image is based on a trend established by at least a prior image of the related subsets.

17. The method of claim 16, further comprising:
receiving a predicted image of a related images requested by the node from the multidimensional data where the predicted image is based on at least a direction of movement of a prior image of a sequence of the related subsets.

18. The method of claim 16, further comprising:
receiving a predicted image of a related images requested by the node from the multidimensional data where the predicted image is based on at least an angular change made with respect to a prior image of a sequence of the related subsets.

19. The method of claim 16, further comprising:
receiving a predicted image of a related images requested by the node from the multidimensional data where the predicted image is based on at least a change made to an eyepoint with respect to a three dimensional graphical object represented by a prior image of a sequence of the related subsets in two dimensions.

20. The method of claim 13, further comprising:
updating the synchronization metadata of the node to include synchronization metadata that indicates knowledge by the node of the at least one version received by the node.

21. The method of claim 12, further comprising:
including anatomical data in at least one of the related subsets;
displaying a first image corresponding to the anatomical data viewed at a first eyepoint angle;
displaying a second image corresponding to the anatomical data viewed at a second eyepoint angle identical to the first eyepoint angle; and
predicting a next image for display based on the first and second eyepoint angles.

* * * * *